United States Patent [19]

Freeman et al.

[11] Patent Number: 5,167,707
[45] Date of Patent: Dec. 1, 1992

[54] HIGH PERFORMANCE COARSE PARTICLE SIZE SAMS PIGMENTS FOR PAINT AND PLASTICS APPLICATIONS

[75] Inventors: Gary M. Freeman, Macon; John M. M. Harrison, Dry Branch; Marion M. Jones, Warner Robins; Thad T. Broome, Macon, all of Ga.

[73] Assignee: J. M. Huber Corporation, Rumson, N.J.

[21] Appl. No.: 676,582

[22] Filed: Mar. 29, 1991

[51] Int. Cl.[5] .......................... C09C 1/02; C09C 1/28; C01B 33/26
[52] U.S. Cl. .................... 106/416; 106/467; 106/468; 106/486; 106/487; 423/118; 423/328.2; 428/452; 428/453; 428/471; 501/144; 501/145
[58] Field of Search ............... 106/416, 467, 468, 486, 106/487; 501/144, 145; 423/118, 328, 329; 428/452, 453, 471

[56] References Cited

U.S. PATENT DOCUMENTS 4,863,796  9/1989  Wason ................................ 106/467

Primary Examiner—William R. Dixon, Jr.
Assistant Examiner—Scott L. Hertzog
Attorney, Agent, or Firm—Harold H. Flanders; Alec H. Horn; Robert L. Price

[57] ABSTRACT

High performance synthetic sodium aluminosilicate compositions, and the method of making the same by the hydrothermal reaction of certain delaminated kaolin clays with select sodium silicate reagents, result in enhanced performance flatting agents for paint systems and anti-block agents for plastic film applications.

17 Claims, 7 Drawing Sheets

HIGH PERFORMANCE COARSE PARTICLE SIZE SAMS PIGMENTS FOR PAINT AND PLASTICS APPLICATIONS

BACKGROUND OF THE INVENTION

The present invention relates in general to improved pigments and more particularly to improved synthetic sodium aluminosilicates and the methods of making the same.

RELATED ART

The coarse particle size, low structure SAMS pigments described herein are synthetic sodium aluminosilicate compositions prepared from the hydrothermal reaction of special delaminated kaolin clays with select sodium silicate reagents. The reaction products of this invention are "unique" versus SAMS pigments of the prior art (per REFERENCES 1 and 2) in that they offer greatly enhanced performance properties as flatting agents for various paint systems and as anti-block agents for plastic film applications. In addition, the present SAMS products are ideally produced utilizing a combination of reaction parameters that clearly lie outside the preferred conditions of the previous SAMS art described in REFERENCES 1 and 2. Literature relevant to discussing this new pigment technology is cited below along with a brief technical description of each:

Reference 1

S. K. Wason; U.S. Pat. Nos. 4,812,299 (1989), 4,863,796 (1989) and 4,954,468 (1990) as well as the various references cited therein. This work focused on medium to high structure SAMS pigments wherein structure was defined by their oil absorption properties. The most preferred embodiment of this art called for the hydrothermal reaction of kaolin clay and sodium silicate base at Base/Clay molar ratios of 0.25 to 0.9. This reaction stoichiometry is in contrast to the preferred B/C molar ratio of 1.0 to 1.4 used in the present SAMS invention. The SAMS pigments of the prior art were shown to offer some flatting and film anti-block properties, but are clearly inferior in functional performance to those of the present invention.

Reference 2

G. M. Freeman; patent application U.S. Ser. No. 567,563 (1990), abandoned and references cited therein. This work showed how to prepare unique high structure yet low oil absorption SAMS pigments offering enhanced optical/opacifying properties versus the SAMS pigments of REFERENCE 1.

Reference 3

Kurbus, et. al.; Z. Anorg. Allg. Chem., 429, 156–161 (1977). This work describes the hydrothermal reaction of sodium silicate with kaolin clays using essentially a 1:1 molar ratio of the reactants so as to yield a crystalline zeolite mineral called analcime. Analcime can be described in terms of its oxide constituents as $Na_2O:Al_2O_3:4SiO_2:2H_2O$.

The hydrothermal reactions of the present invention used sodium silicate and kaolin clay at preferred B/C molar ratios of 1.0 to 1.4. However, a unique combination of reaction parameters were utilized, including a special delaminated clay feedstock, such that no crystalline zeolites were formed. The reaction products of this invention show X-ray diffraction peaks only for an attenuated kaolinite pattern.

Reference 4

S. K. Wason; U.S. Pat. Nos. 3,993,497, (1976) and 4,312,845 (1982). These patents describe the preparation of amorphous silica pigments from sodium silicate solutions. These $SiO_2$ pigments are reported to be useful as flatting agents for paints and lacquers. They do not however involve any hydrothermal reaction between kaolin clay and sodium silicate reagent.

Reference 5

H. V. Shah, et. al.; Paintindia, 20 (3), 19–20 (1970). This work describes the preparation of a calcium aluminosilicate pigment using lime, silica and an aluminum reagent which was subsequently found to provide titanium dioxide extension and flatting properties in paint formulations. Again, this art does not involve any hydrothermal reaction between metal silicate base and kaolin clay.

Reference 6

B. Martensson; Polym., Paint Colour J., 169 (4011), 1014–16 (1979). This article discusses the benefits of using neutral sodium aluminosilicate extender pigments in $TiO_2$ pigmented flat latex paints. These synthetic amorphous sodium aluminosilicates are produced by the reaction of alum with alkali metal silicate (as generally disclosed in U.S. Pat. Nos. 2,739,073, 2,848,346 and 3,582,379). Such pigments do not involve any hydrothermal reaction between sodium silicate base and kaolin clay.

Reference 7

A. G. Butters, et. al.; Particle Size Analysis 1981, 425–436; edited by N. G. Stanley-Wood and T. Allen; copyright 1982, Wiley Hayden Ltd.

B. C. Negus, et. al.; United Kingdom Atomic Energy Establishment Report 9075, AERE (1978).

C. B. J. Azzopardi; United Kingdom Atomic Energy Establishment Report M3067, AERE (1980).

D. B. B. Weiner; Chem. Anal. (N.Y.)—Mod. Methods Particle Size Anal., 135–172 (1984).

These technical articles discuss the basic principles of particle size measurement based upon Fraunhofer (laser) diffraction theory. The Malvern particle size instrument, used herein to describe our delaminated clay feedstocks and SAMS pigments, is based upon measuring the Fraunhofer diffraction pattern produced by dispersed particles in a parallel beam of monochromatic coherent light. This new technique has been applied, rather than using the standard X-ray sedimentary particle method, since the products of this invention depart significantly from "Stokes Law" by nature of their large, platelet-like morphology.

Reference 8

A. H. Wadell; J. Geology, 40, 443–451 (1932).

B. B. C. Aschenbrenner; J. Sedimentary Petrology, 26 (1), 15–31 (1956).

These articles discuss the fundamental principles involved in describing particle shape as applied to sedimentary type particles. A quantitative description of particle shape was developed based on a mathematical formula defining "sphericity." This sphericity concept has herein been applied to our delaminated clay feedstocks to describe their relative aspect ratio properties.

BRIEF SUMMARY OF THE INVENTION

High performance synthetic sodium aluminosilicate compositions, and the method of making the same by the hydrothermal reaction of certain delaminated kaolin clays with select sodium silicate icogents, result in enhanced performance flatting agents for paint systems and anti-block agents for plastic film applications.

DETAILED DESCRIPTION OF THE INVENTION

Figure 1:
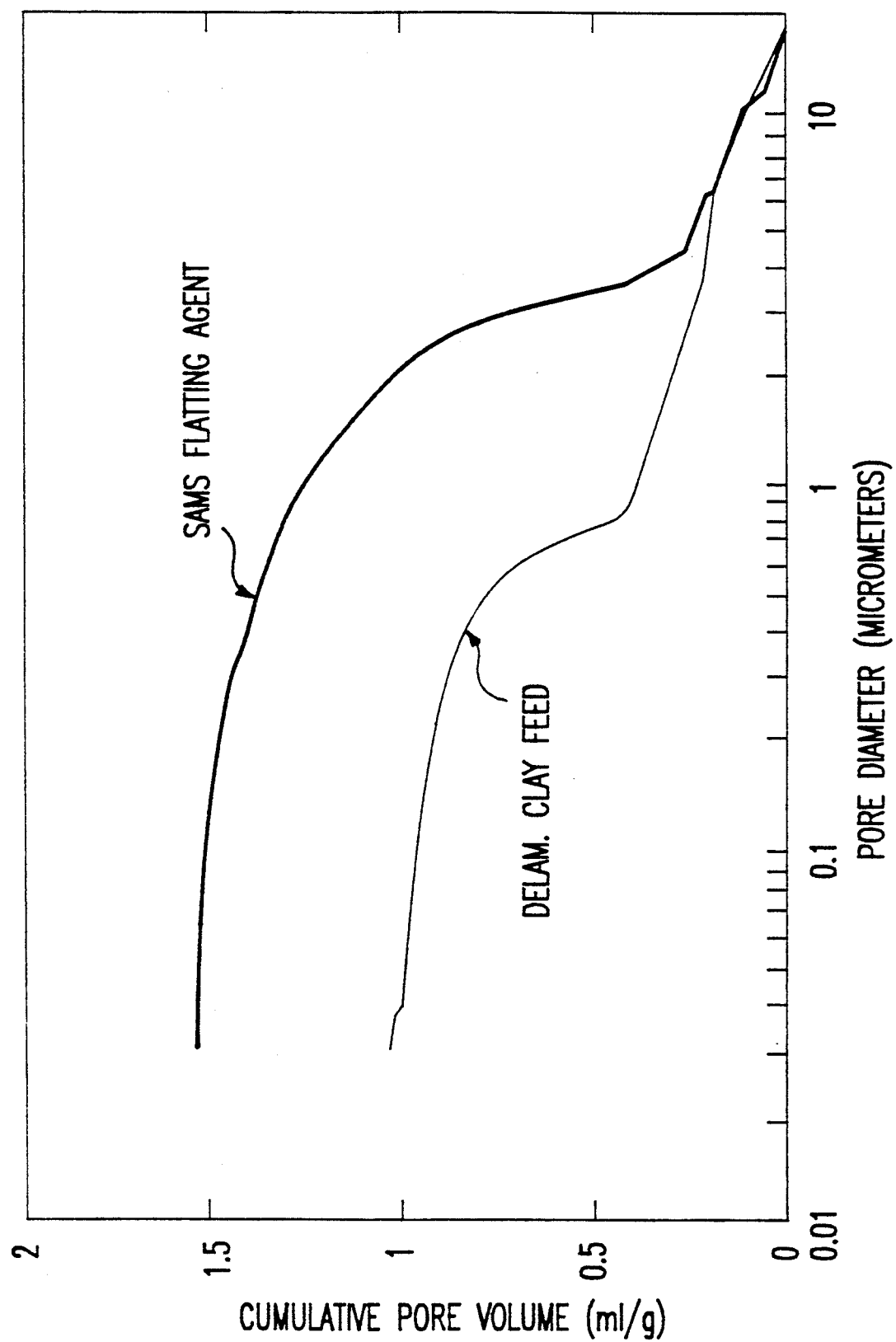
FIG. 1 plots cumulative pore volume vs. pore diameter for a SAMS flatting agent and a delaminated clay feedstock.

A method for preparing high performance SAMS pigments of coarse particle size and low structure properties is disclosed. The SAMS pigments of this invention are particularly functional as flatting agents in paint or as anti-block agents in plastic film. They far exceed the performance properties of any prior art SAMS pigments (per REFERENCES 1 and 2) in these applications. The SAMS pigments described herein are synthetic sodium aluminosilicate compositions produced by a sodium silicate/clay reaction conducted under hydrothermal type conditions as generally disclosed in REFERENCE 1. However, the present SAMS pigments require a "unique" combination of reaction parameters in conjunction with the use of a "special" delaminated clay feedstock to yield the desired product properties. In short, the present SAMS pigments represent a significant advancement in the art and can be thought of as a more preferred embodiment of the earlier Wason patents.

The SAMS pigments of this invention also represent an anomaly to the prior art knowledge in that they offer superior paint flatting and film anti-block properties versus Samhide 583 and Samflex 585, respectively, despite their low structure properties. The present SAMS pigments have low oil absorption values, preferably in the range of 90–110 gm/100 gm, while the Samhide 583/Samflex 585 pigments are typically 150 gm/100 gm. In the earlier SAMS art (REFERENCE 1), pigment performance properties were equated directly to "structure" as defined by an arbitrary set of oil absorption criteria. In this invention however, functional performance properties as flatting agents or as anti-block agents are more directly related to SAMS pigment particle size than to pigment structure level. Greater flatting efficiency or film anti-block efficiency has been observed for SAMS pigments as their aggregate particle size was systematically increased. Pigment structure, as defined by porosimetry based principles rather than by oil absorption criteria (see REFERENCE 2), is important to the SAMS pigments of this invention only in that it helps determine their optical/opacifying properties. However, opacity is a secondary consideration with these pigments versus flatting or anti-block performance.

In order to properly gauge the functionality of SAMS pigments produced in this work for flatting and anti-block applications, it became necessary to develop a more reliable method of measuring pigment particle size. The use of standard X-ray sedimentation methods for determining particle size was no longer valid here, because of the extreme departure from "Stokes Law." Stokes Law can not be accurately applied because of the large, tremendously platy nature of the delaminated clay feedstock and resulting SAMS reaction product. Particle size measurements were thereby made using a Malvern Mastersizer E Unit, whose operating principles are based on Fraunhofer (laser) diffraction theory (REFERENCE 7). Applying these new particle size measurement principles, a select and unobvious combination of reaction parameters were identified and then utilized to yield highly functional SAM pigments for flatting and anti-block applications. Accordingly the objects of present invention include the following:

1. To provide a manufacturing method for producing new SAMS pigments that yield far superior flatting properties in various paint systems versus the SAMS pigments of the prior art.

2. To provide a highly effective SAMS flatting agent having a very low crystalline silica content (less than 0.1% by weight). This SAMS pigment would then function to effectively replace calcined diatomaceous silica flatting agents (like Dicalite L-5, Celite 281 or Celite 499) on a 1:1 weight replacement basis. The inherent product advantages offered by the SAMS flatting pigment would include the following:

a. Ease of use is a strong selling point, in that little to no paint reformulation is typically required in replacing Celite 281 with the SAMS pigment of this invention.

b. The use of SAMS flatting pigment eliminates the potential for airborne crystalline silica hazards (per OHSA recommendations) in the paint manufacturers work place. The calcined diatomaceous silica flatting agents have come under recent regulatory scrutiny because of their extremely high crystalline silica content (typically containing 50+% by weight).

c. The SAMS flatting pigment offers the paint manufacturer a distinct marketing advantage in that its use now obviates the need for any special warning labels concerning crystalline silica content on their can of paint.

d. The high inherent alkalinity of the SAMS flatting pigment helps to buffer latex paint systems at high pH, thereby inhibiting microbial growth and improving can corrosion resistance during paint storage.

3. To provide a manufacturing method for producing new SAMS pigments that offer far superior film anti-block properties versus the prior art SAMS materials.

4. To provide a highly effective, low crystalline silica pigment designed for replacing calcined diatomaceous silica products (like Superfloss) as a film anti-block agent. In regards to the crystalline silica issue, use of the SAMS anti-block agent again affords some operational safety benefits to the custom plastics compounder. The low crystalline silica content of SAMS also promotes lower abrasion characteristics versus products like Superfloss. Reduced filler abrasion will ultimately translate to less wear and less down time of plastics compounding/processing equipment.

5. To provide highly functional SAMS pigments, for paint flatting and for film anti-block applications, of low cost. The SAMS pigments of this invention are more cost effective to produce as a result of their greatly increased production rates versus that obtained in the prior art processes. Production rate improvements were largely realized from the unique ability to now use high solids reaction conditions (20-23% solids versus the typical 10% solids of the prior art). Since the total reaction time and temperature requirements have remained approximately the same, SAMS pigments of the present invention can be produced at essentially twice the tonnage rate of a Samhide 583 or Samflex 585 pigment. In terms of energy savings alone, this process innovation offers profound manufacturing cost benefits.

6. To provide a clay processing method yielding a delaminated clay product that is specially designed to function as a highly preferred feedstock for SAMS pigments of the present invention. Delaminated clays of specific particle size and particle size distribution properties are required. The key step of our clay process involves the sufficient removal of fine particles by centrifugal clipping after the clay has undergone delamination in the Denver Mills.

In satisfaction of the foregoing objects and advantages, there is provided by this invention synthetic sodium aluminosilicate compositions of the general oxide formula

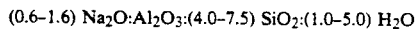

$$(0.6-1.6) \; Na_2O : Al_2O_3 : (4.0-7.5) \; SiO_2 : (1.0-5.0) \; H_2O$$

These SAMS products may be characterized as substantially amorphous materials with attenuated kaolinite peaks. They also exhibit the following characteristic physical properties:

1. An average particle diameter (by Malvern) of 12.8-14.8 microns.
2. Specific surface are (by Malvern) of 0.68-0.78 $m^2$/gm.
3. BET surface areas of 3-9 $m^2$/gm, but more preferably 5-7 $m^2$/gm.
4. Oil absorption values that range from 90-110 gm/100 gm.
5. Total pore volume by mercury intrusion of 1.2-1.8 ml/gm, but more preferably 1.4-1.6 ml/gm.
6. Pore structure with pore diameter sizes that range from 2.0-4.0 microns as determined by log differential intrusion analysis.

The preferred SAMS pigments of this invention are produced from the hydrothermal reaction of a custom tailored delaminated clay with select sodium silicate bases. The unique combination of reaction parameters and feedstocks that must be employed are summarized below:

1. The kaolin feedstock required is a very coarse particle size delaminated clay preferably derived from a primarily cretaceous, middle Georgia crude.
2. The delaminated clay feedstock has an average particle diameter (by Malvern) of 6.0-6.5 microns with an accompanying specific surface area value of 0.76-0.90 $m^2$/gm, but more preferably is 0.80-0.87 $m^2$/gm.
3. The sodium silicate base employed has a $SiO_2/Na_2O$ molar ratio composition of 2.6-4.0, but more preferably is 3.3-4.0.
4. Base/Clay molar ratios between 0.8 and 1.6 can be utilized, but B/C ratios from 1.0-1.4 are highly preferred.
5. The hydrothermal reactions of delaminated clay and sodium silicate can be conducted at solids of 15-25%, but reaction solids of 20-23% are highly preferred in reactors utilizing live steam addition.
6. Reaction pressures/temperatures can range from 50-360 psig and from 140°-250° C., but those of 120-130 psig and 172°-175° C. are preferred.
7. At pressures of 120-130 psig, reaction times of 60-75 minutes are typically utilized.
8. Mechanical mixing in the reactor at 375-500 fpm tip speed was employed. High mixing speed was important in obtaining coarse particle size SAMS products.
9. A rapid pressure-up profile was employed, requiring typically 20-25 minutes to reach the desired 120-130 psig cooking pressure.

PREFERRED EMBODIMENTS

The present invention is further illustrated by the following examples, which should be regarded as demonstrating only some of the preferred embodiments and not limiting thereof.

EXAMPLE 1

In this example, a systematic study of SAMS products prepared from sodium silicate/delaminated clay reactions conducted under hydrothermal conditions was undertaken. The purpose of this study was to clearly demonstrate the unique combination of reaction parameters required to yield the desired SAMS products of this invention. As previously described in REFERENCE 2, the reaction parameters that can have a profound influence on the properties of the resulting SAMS product include:

Hydrous clay feedstock
Molar ratio composition of the sodium silicate base
Base/Clay molar ratio
Reaction time
Reaction temperature/pressure
Reaction solids
Reactor mixing intensity
Steam addition profile As can be seen in TABLE 1-A, this reaction study serves to illustrate the respective influence of Base/Clay molar ratio, percent reaction solids and type of sodium silicate reagent on final SAMS properties. In all cases, the SAMS reactions of TABLE 1-A were conducted in a two gallon, mechanically stirred Parr reactor at 120 psig (172° C.) and at a constant mixing speed of 400 rpm over a 1.0 hour cook period. The delaminated clay feedstock utilized in these reactions was a highly delaminated but coarse particle size clay of middle Georgia origins. The feedstock was characterized by Malvern laser light scattering as having an average equivalent spherical particle diameter of 6.3 microns and a specific surface area of 0.84 $m^2$/gm. The total reaction batch weight always equalled 6,000 grams. On that basis, for example, the first reaction of TABLE 1-A which called for the use of N-sodium silicate (molecular weight=262) with the delaminated clay (molecular weight=258) at a 0.5 B/C molar ratio and 18% total solids would require the following batch recipe:

Step 1: 716.3 grams of active spray-dried delaminated clay was made down in water at 50% solids using a Waring blender at high speed.

Step 2: A sodium silicate solution was prepared by combining 967.3 grams of N-silicate reagent (as received from PQ Corporation) and 3,600.1 grams of water.

Step 3: The well dispersed delaminated clay slurry and sodium silicate solution were combined, mixed well and then charged to the Parr reactor for subsequent heating at 172° C. for 1 hour.

The remaining reactions outlined in TABLE 1-A were put together in a fully analogous fashion. Upon completing the one hour cook period at 120 psig (172° C.), each product slurry was cooled to about 65° C. and filtered on a Buchner funnel. The filtercake material was washed with 3 volumes of water and then subsequently redispersed under low shear at approximately 25% solids for spray-drying in a Nichols model 53 dryer. The spray-dried products were then subjected to a full battery of physical property tests, such as percent brightness, oil absorption, XRD, BET surface area, Malvern particle size and total pore volume analysis by mercury intrusion. In particular the Malvern particle size data, in terms of an average equivalent spherical particle diameter, is important in assessing the potential functionality of the structured SAMS pigments as effective flatting agents for paint or as anti-block agents for plastic film.

In PART I of the study, the hydrothermal reaction of N-sodium silicate with delaminated clay was investigated over the B/C molar ratio range of 0.5 to 1.3 while maintaining the total solids at 18%. The physical property data of TABLE 1-A indicate that there was direct correlation in resulting SAMS particle size with the B/C molar ratio utilized. The SAMS pigment particle size was observed to increase from 10.1 to 15.3 microns as the B/C molar ratio was increased. As will be clearly demonstrated in later applications examples, the SAMS particle size range of greatest interest for providing the desired flatting and anti-block properties falls between 12.8–14.8 microns. On that basis, it is clear that SAMS products of the present invention can not be produced at B/C molar ratios of 0.7 or below.

TABLE 1-A

SAMS Reaction Trends

| Sodium Silicate/Delam. Clay Reactions** | | | | SAMS Product Properties | | | | | |
|---|---|---|---|---|---|---|---|---|---|
| Silicate Reagent* | Base/Clay Ratio | Parr Mix Speed, rpm | Reaction Solids, % | Brightness, % | Oil Abs., g/100 g | Total Pore Vol.***, ml/g | "Malvern" Av. Particle Dia., microns | BET Surface Area, m²/g | XRD Analysis |
| (B/C Series) | | | | | | | | | |
| N | 0.5 | 400 | 18 | 90.4 | 106 | 1.91 | 10.1 | 7.4 | Attenuated Kaolin |
| N | 0.7 | 400 | 18 | 90.8 | 105 | 1.84 | 11.9 | 6.6 | Attenuated Kaolin |
| N | 0.9 | 400 | 18 | 91.3 | 105 | 1.40 | 13.6 | 6.2 | Attenuated Kaolin |
| N | 1.1 | 400 | 18 | 91.4 | 103 | 1.42 | 14.5 | 5.9 | Attenuated Kaolin |
| N | 1.3 | 400 | 18 | 91.5 | 100 | 1.63 | 15.3 | 5.8 | Attenuated Kaolin |
| (% Solids Series) | | | | | | | | | |
| N | 1.1 | 400 | 14 | 91.2 | 102 | 1.48 | 12.7 | 6.3 | Attenuated Kaolin |
| N | 1.1 | 400 | 16 | 91.3 | 97 | 1.60 | 13.8 | 6.1 | Attenuated Kaolin |
| N | 1.1 | 400 | 18 | 91.4 | 103 | 1.42 | 14.5 | 5.9 | Attenuated Kaolin |
| (Silicate Series) | | | | | | | | | |
| N | 1.1 | 400 | 18 | 91.4 | 103 | 1.42 | 14.5 | 5.9 | Attenuated Kaolin |
| RU | 1.1 | 400 | 18 | 91.7 | 92 | 1.68 | 11.5 | 10.7 | Attenuated Kaolin + Zeolite-P |
| D | 1.1 | 400 | 18 | 92.4 | 93 | 1.59 | 10.7 | 6.3 | Attenuated Kaolin + Zeolite-P |

Note:
*All sodium silicates utilized here are Commercially available from the PQ Corporation. The SiO₂/Na₂O mole ratio composition of each silicate is as follows:
N = 3.33 SiO₂/Na₂O M.R. (Mol. Wt. = 262)
RU = 2.47 SiO₂/Na₂O M.R. (Mol. Wt. = 211)
D = 2.06 SiO₂/Na₂O M.R. (Mol. Wt. = 186)
**Clay feedstock used was a Middle Ga., delaminated type having a "Malvern" Av. Particle Diameter and Specific Surface Area of 6.3 microns and 0.84 m²/g, respectively. The hydrothermal conditions utilized in these reactions were as follows:
120 psig cook (172° C.),
1.0 hour cook time,
2 gallon laboratory Parr reactor.
***Values were determined by mercury porosimetry method (see footnote of Table 1-C for full details).

In PART II, N-sodium silicate/delaminated clay reactions of 1.1 B/C molar ratio were conducted wherein the total reaction solids was varied from 14.0 to 18.0%. The physical property data again indicate a corresponding increase in SAMS product particle size, from 12.7 to 14.5 microns, as the reaction solids were increased from 14 to 18%. These data suggest that the reaction solids should generally be kept above 14% to produce the desired products of the present invention.

Finally, various sodium silicate/delaminated clay reactions of 1.1 B/C molar ratio and 18% total solids were conducted to assess final product effects as a function of starting sodium silicate reagent. SAMS reactions were conducted with N, RU and D sodium silicates, respectively, which span the SiO$_2$/Na$_2$O molar ratio composition range from 3.33 to 2.06. The physical property data clearly indicate a corresponding decrease in SAMS product particle size, from 14.5 to 10.7 microns, as the molar ratio composition of the sodium silicate reagent employed decreased from 3.33 down to 2.06. These data suggest that sodium silicate reagents having a SiO$_2$/Na$_2$O molar ratio composition greater than 2.5 are more conducive to yielding SAMS products of the instant invention. Preferably sodium silicate reagents of 3.3 to 4.0 molar ratio composition are employed. A table detailing the composition and properties of all the various sodium silicate reagents commercially available from the PQ Corporation is enclosed as TABLE 1-B. Some suitable sodium silicates would thus include those sold under the commercial trade names of K, N and S35.

TABLE 1-C

SAMS Structure Classifications Vs. Pore Volume*

| Pigment Structure Level | Total Pore Volume**, ml/g |
|---|---|
| VHS (Very High Structure) | Above 3.3 |
| HS (High Structure) | 2.5–3.3 |
| MS (Medium Structure) | 1.6–2.5 |
| LS (Low Structure) | 0.8–1.6 |
| VLS (Very Low Structure) | Less than 0.8 |

Note:
*As previously defined in Ref. #2.
**Values determined by Mercury Intrusion Porosimetry using a Micromeritics AutoPore-II 9220 unit. Pore volumes were determined over an intrusion pressure range of 10.0–6,029 psia. Data were collected using an advancing contact angle of 130 degrees and a pressure equilibration time of 10 seconds per intrusion measurement point.

EXAMPLE 2

TABLE 1-B

TABLE - PQ SODIUM SILICATE SOLUTIONS

| Product Name | Wt. Ratio SiO$_2$/Na$_2$O | % Na$_2$O | % SiO$_2$ | Density at 68° F. (20° C.) | | | pH | Viscosity Centipoises | Characteristics |
|---|---|---|---|---|---|---|---|---|---|
| | | | | °Be' | lb/gal | g/cm$^3$ | | | |
| S35 ® | 3.75 | 6.75 | 25.3 | 35.0 | 11.0 | 1.31 | 11.1 | 220 | Consistency of thin syrup |
| STIXSO ® RR | 3.25 | 9.22 | 30.0 | 42.7 | 11.8 | 1.41 | 11.3 | 830 | Syrupy liquid |
| N ® | 3.22 | 8.90 | 28.7 | 41.0 | 11.6 | 1.38 | 11.3 | 180 | Syrupy liquid |
| E ® | 3.22 | 8.60 | 27.7 | 40.0 | 11.5 | 1.37 | 11.3 | 100 | Specially clarified |
| O ® | 3.22 | 9.15 | 29.5 | 42.2 | 11.8 | 1.41 | 11.3 | 400 | More concentrated than N ® |
| K ® | 2.88 | 11.00 | 31.7 | 47.0 | 12.3 | 1.47 | 11.5 | 960 | Sticky heavy silicate |
| M ® | 2.58 | 12.45 | 32.1 | 49.3 | 12.6 | 1.50 | 11.8 | 780 | Syrupy liquid |
| STAR ® | 2.50 | 10.60 | 26.5 | 42.0 | 11.7 | 1.40 | 11.9 | 60 | Brilliantly clear, stable solution |
| RU ® | 2.40 | 13.85 | 33.2 | 52.0 | 13.0 | 1.55 | 12.0 | 2,100 | Heavy syrup |
| D ® | 2.00 | 14.70 | 29.4 | 50.5 | 12.8 | 1.53 | 12.7 | 400 | Syrupy alkaline liquid |
| C ® | 2.00 | 18.00 | 36.0 | 59.3 | 14.1 | 1.68 | 12.7 | 70,000 | Heavy alkaline liquid |
| STARSO ® | 1.80 | 13.40 | 24.1 | 44.6 | 12.0 | 1.43 | 12.9 | 60 | Specially clarified |
| B-W ® | 1.60 | 19.70 | 31.5 | 58.5 | 14.0 | 1.67 | 13.4 | 7,000 | High alkalinity; fairly fluid |

A number of other interesting property trends can be observed from the data of TABLE 1-A. First it should be noted that pigment oil absorption values varied very little throughout the entire reaction series, ranging from only 92–106 grams/100 grams. However, total pore volumes varied to a much greater extent. The pigment pore volumes within the series ranged from 1.40–1.91 ml/gm, while those of just 1.4–1.6 ml/gm corresponded to SAMS products having the most desired particle size properties. Total pore volumes of 1.4–1.6 ml/gm correspond to SAMS pigments having "low structure" per the structure level definitions proposed in REFERENCE 2 (see TABLE 1-C). Secondly, one should note the very low BET surface face area values (typically 5–7 m$^2$/gm) associated with the SAMS pigments of this invention. These low surface area values should be contrasted to the preferred surface area range of 10–30 m$^2$/gm describing the prior art SAMS products of REFERENCE 1. Finally, the preferred SAMS pigments of this invention are structured agglomerates comprised of partially altered kaolin clay platelets having an integral rim area of amorphous, non-diffracting sodium silicate-kaolin reaction product. They thus exhibit an X-ray diffraction pattern of attenuated kaolinite without the accompanying presence of any synthetic, crystalline zeolites. As was illustrated in TABLE 1-A, the use of sodium silicate reagents of 2.5 molar ratio composition or below (like the RU and D silicates) have a pronounced tendency at our high B/C reaction ratios to yield products containing some crystalline zeolite.

This study illustrates the significant influence that clay feedstock particle size can have on resulting SAMS product properties. In particular, this study examined a range of different delaminated clays as SAMS feedstocks. The delaminated clays examined systematically varied in their average particle size and particle size distribution properties. The average particle size, on the basis of an average equivalent spherical particle diameter, was determined by Malvern laser light scattering. Information regarding particle distribution can be inferred from the delaminated clay's specific surface area value (as also determined by the Malvern unit). In comparing clays of equivalent average particle size, a higher specific surface area value would reflect the presence of a greater percentage of fine particles.

In short, this reaction study serves to demonstrate that not all delaminated clays are suitable feedstocks for yielding the desired SAMS pigments of this invention. In fact, it has been experimentally determined that the most suitable delaminated clays typically have an average particle size of 6.0–6.5 microns with a specific surface area of 0.76–0.90 m$^2$/gm (or more preferably 0.80–0.87 m$^2$/gm). Delaminated clays outside those particle size boundaries will tend to yield SAMS pigments that do not meet the requirements of this invention.

The delaminated clay feedstocks labeled B through G of TABLE 2 are related to one another in that they are all derived from the same crude clay centrifuge underflow stream (A). In this experiment, a clay centrifuge underflow stream of 8.1 micron average particle size (A) was derived from a starting blend of middle Georgia, Cretaceous and Tertiary clay crudes. This centrifuge underflow clay was then subjected to standard magnetic separation (to improve its brightness and color) prior to grinding in a set of Denver mills loaded with glass beads. The delaminated clay was then leached, filtered and dispersed using standard beneficiation procedures. Sufficient grinding for delamination in the Denver mills had been applied so that the average particle size of the clay product obtained was approximately 6.0 microns. The specific surface area of the finished delaminated clay (B of TABLE 2) was determined to be 0.97 $m^2/gm$ while its aspect ratio was approximately 10.7:1. As shown in TABLE 2, the SAMS pigment produced from delaminated clay (B) failed to meet the 12.8–14.8 micron product particle size requirements of this invention.

weight of 6,000 gm, this required 510.1 gm of active delaminated clay, 1515.6 gm of N-silicate reagent (as received) and 3974.3 gm of batch water to yield the desired reaction stoichiometry. The resulting SAMS products were filtered, washed and spray-dried as previously described in EXAMPLE 1.

The SAMS particle size properties of TABLE 2 indicate that preferred SAMS pigments of this invention are readily produced when a sufficient amount of ultrafine clay particles were removed from the original delaminated clay feedstock (B). Feedstock C, D and E (having specific surface areas of 0.90–0.84 $m^2/gm$) all yielded desirable SAMS pigments particularly useful as flatting agents in paints and/or as film anti-block agents. It

TABLE 2

SAMS Produced from Select Centrifuge - Clipped Delaminated Clays

| | | Clay Particle Size Data | | Resulting SAMS*** Product | |
|---|---|---|---|---|---|
| | | "Malvern" | | "Malvern" | |
| Test ID | Clay Feedstock Description | Average Particle Dia., microns | "Malvern" Specific Surface Area. $m^2/g$ | "Malvern" Av. Particle Dia., microns | "Malvern" Specific Surface Area. $m^2/g$ |
| A | Centrifuge UF** from Crude Clay | 8.1 | 0.79 | — | — |
| B* | Delaminated Clay (Control) | 6.0 | 0.97 | 11.5 | 0.78 |
| C | Clipped Delam. Clay | 6.2 | 0.90 | 12.8 | 0.77 |
| D | Clipped Delam. Clay | 6.3 | 0.87 | 13.6 | 0.74 |
| E | Clipped Delam. Clay | 6.3 | 0.84 | 14.5 | 0.70 |
| F* | Clipped Delam. Clay | 6.5 | 0.76 | 15.6 | 0.67 |
| G | Clipped Delam. Clay | 6.5 | 0.74 | 17.0 | 0.59 |
| H*,++ | Std. Delam. Clay (Hydraprint) | 4.9 | 1.22 | 12.2 | 0.83 |

Note:
*The relative Aspect Ratio values for these different delaminated feedstock clays can be determined as follows:

| | BET Surface Area. $m^2/g$ | Pigment Aspect Ratio+ (BET S.A./Sp.-S.A.) |
|---|---|---|
| Delam. Clay (B) | 10.4 | 10.7:1 |
| Delam. Clay (F) | 9.1 | 12.0:1 |
| Delam. Clay (H) | 11.8 | 9.7:1 |

**UF = Underflow Fraction from centrifuge.
***All SAMS were Parr reactor products utilizing N - silicate: 400 rpm mix, 1.1 B/C Ratio, 18% reaction solids at 120 psig (172° C.) over 1.0 hour.
+Calculation per discussions in Ref. #8.
++XRD analysis of the resulting SAMS product indicated significant levels of Zeolite-P formation.

Developmental efforts were therefore undertaken to provide a more suitable SAMS feedstock by removing a portion of the fine particles from delaminated clay (B) by means of centrifugal clipping. A filtercake storage tank of delaminated clay slurry (B) was thereby re-circulated through a 40" d×60" l solid bowl Bird centrifuge operating at 1,000 G's and at its deepest pool setting. The feed solids of the delaminated clay slurry to the centrifuge were adjusted to 27% and a slurry feed rate of 50 gpm (4.0 tph clay) was utilized to yield 79 wt. % of a clipped underflow fraction that was subsequently returned to the storage tank. During the course of this centrifugal clipping run, periodic clay samples were drawn from the storage tank to check its particle size and to serve as experimental feedstock for a SAMS Parr reactor run. In all, clipped feedstocks (C, D, E, F and G) were successively collected and then tested (see TABLE 2). A successively greater portion of clay fines removal is clearly indicated by their decreasing specific surface area values. For each new feedstock, the analogous SAMS reaction was conducted utilizing N-sodium silicate (3.33 mole ratio composition) at a 1.1 B/C molar ratio and 18% total reaction solids. The reactions were subjected to a 120 psig (172° C.) cook over 1 hour using a Parr mixing speed of 400 rpm. For a total batch should be noted the delaminated clay feedstocks that were useful for producing desired SAMS pigments can be additionally characterized as having clay aspect ratios between about 11:1 and 12:1. In contrast standard delaminated type coating clays, such as that sold commercially by J. M. Huber Corporation under the trademark Hydraprint, are much finer in average particle size, have high specific surface area and exhibit aspect ratios of generally 10:1 or below. Such standard delaminated clays (i.e., H) are not particularly useful as feedstocks for producing the desired SAMS pigments of this invention.

In summary, this example outlines a special process involving delamination and subsequent centrifugal removal of fines from a coarse clay that results in a suitable delaminated clay feedstock for producing SAMS pigments particularly useful as flatting agents or as film anti-block agents. By centrifugal clipping, the unsuitable delaminated clay feedstock (B) was thereby transformed into the highly desirable feedstock (E).

EXAMPLE 3

In this study, a hydrothermal reaction between sodium silicate and delaminated clay designed to yield a SAMS pigment per the scope of this invention was appropriately scaled up from the laboratory Parr reactor to a 7200 gallon high pressure plant reactor. The delaminated clay feedstock utilized in this production run had been previously prepared by a similar delamination/ centrifugal clipping process to that described in EXAMPLE 2. The average particle size and specific surface area of the delaminated clay feedstock was 6.0 microns and 0.83 m$^2$/gm respectively. Other important chemical and physical properties characteristic of the delaminated clay are summarized in TABLE 3-A.

TABLE 3-A

Comparison of Typical Chemical/Physical Properties:
Coarse P.S. SAMS Vs. Delaminated Clay Feedstock

| | Chemical Analysis, % | |
|---|---|---|
| | Delaminated Kaolin | Coarse P.S. SAMS (Example 3) |
| TiO$_2$ | 0.57 | 0.34 |
| Fe$_2$O$_3$ | 0.29 | 0.21 |
| SiO$_2$ | 45.37 | 61.22 |
| Al$_2$O$_3$ | 39.66 | 17.87 |
| Na$_2$O | 0.18 | 9.49 |
| H$_2$O (% LOI)* | 13.93 | 10.87 |
| XRD | Kaolinite | Attenuated Kaolin |
| Crystalline Silica | <0.05 | <0.03 |
| Physical Properties: | | |
| Pore Volume, ml/g (by Mercury Intrusion)** | 1.03 | 1.54 |
| BET Surface Area, m$^2$/g | 9.4 | 6.0 |
| pH (at 20% solids) | 6.7 | 11.6 |
| Oil Absorption, g/100 g pigment | 32 | 100 |
| Brightness, % | 88.0 | 90.5 |
| Specific Gravity | 2.60 | 2.40 |
| Sedigraph Particle Size: | | |
| % +5 microns | 16.5*** | 67.5*** |
| % −2 microns | 47.0*** | 8.5*** |
| Malvern**** Particle Size: | | |
| Average Equiv. Spherical Particle Diameter, Microns | 6.0 | 13.8 |
| Specific Surface Area, m$^2$/g | 0.83 | 0.72 |

Note:
*LOI = Loss on Ignition (@ 925° C.)
**Total pore volumes were determined over an intrusion sure range of 10.0–6029 psia. Data were collected using an advancing contact angle of 130 deg. and a pressure equilibration time of 10 sec. per intrusion measurement point. A Micromeritics AutoPore-II 9220 porosimeter was used for all measurements.
***Sedigraph P.S. measurements on these pigments are reported here but are considered highly suspect because of the significant departure from "Stokes Law".
****A laser light - scattering particle size method using a Malvern Mastersizer E Analyzer.

The full scale production run was commenced using the delaminated clay of TABLE 3-A with N-sodium silicate reagent at a B/C molar ratio of 1.2. To the plant reactor were added 18,117 lbs. of water and 14,418 lbs. (as received) of N-sodium silicate solution. The N-silicate reagent has a SiO$_2$/Na$_2$O molar ratio composition of 3.33 and is 37.6% active. Next, 9,465 lbs. of delaminated clay slurry at 47.0% solids was added. The reactor contents were continuously mixed by a mechanical agitator turning at 35 rpm (440 fpm tip speed) and heated to a final temperature of 175° C. (130 psig) using live steam injection. Steam was introduced at an initial steam flow rate of approximately 30,500 lbs./hr. Efficient steam addition was accomplished by employing an internal steam sparger system and a linear pressure-up profile (requiring a total ramp-up time of 23 minutes) was utilized. Upon reaching our operating temperature and pressure the reaction solids had reached 21%. After heating the reaction batch at 130 psig for a total of 75 minutes, the resulting product slurry was vented into a drop tank and subsequently filtered, washed with water, redispersed at low shear and then spray-dried to a free moisture content of approximately 4%. Product filtration and filtercake washing were accomplished using a string discharge rotary vacuum type filter equipped with an accessory wash blanket. Sufficient filtercake washing was employed so as to yield 35% solids filtercake material having a conductivity value of 2,000 mhos or less. From experience we have determined that a conductivity value of 2,000 mhos insures that sufficient product washing has occurred to achieve the maximum possible product brightness.

Given the relative amounts of N-sodium silicate, delaminated clay and water employed in this hydrothermal process, the batch composition for the reaction can be expressed in terms of its various oxide constituents as

Figure 2:
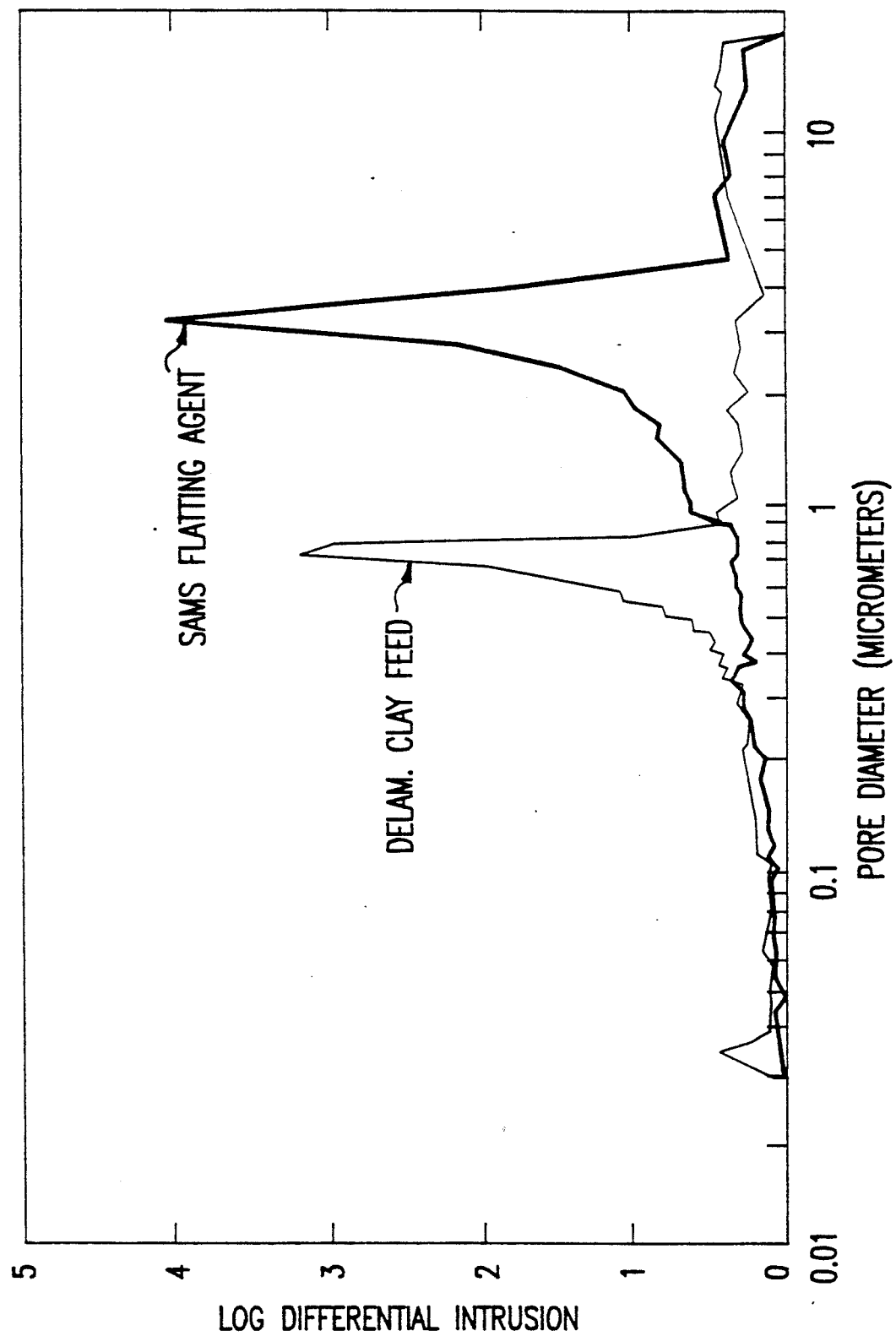
FIG. 2 represents the log differential intrusion curves as a function of pore diameter for a SAMS flatting agent and a delaminated clay feedstock.

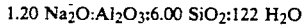

$$1.20\ Na_2O:Al_2O_3:6.00\ SiO_2:122\ H_2O$$

when normalized with respect to the Al$_2$O$_3$ molar content. The spray-dried reaction product was evaluated and characterized by a full battery of test methods. The chemical and physical properties of this SAMS product are summarized in TABLE 3-A. Generically, the SAMS product can be described as a sodium aluminosilicate composition. In TABLE 3-A, the chemical and physical properties of the SAMS reaction product are compared directly against those of its starting delaminated clay feedstock. From this data, it can be clearly seen that the hydrothermal reaction process transforms the delaminated clay into a unique product having a vastly different array of properties. In particular, one should note the substantial increase in the average pigment particle size from 6.0 microns (for the delaminated clay) to 13.8 microns (for our SAMS). Also, a substantial change in pigment pore structure is indicated from the mercury intrusion pore volume data. The pore structure changes resulting from our hydrothermal reaction process can be more clearly seen in the porosimetry curves of FIGS. 1 and 2. The cumulative pore volume (FIG. 1) and log differential intrusion (FIG. 2) curve comparing SAMS and delaminated clay indicate essentially a 50% increase in pigment structure with the majority of the porosity building occurring in the pore diameter size range of 2–4 microns. The SEM of the delaminated clay feedstock shows large, platelet-like particles of kaolinite, whereas the SEM's of the SAMS product show a unique combination of different pigment morphologies being present, including: (a.) large, relatively flat rim-altered platelets of reacted kaolinite with low structure properties; (b.) large, rim-altered platelets having also a multitude of smaller, highly altered clay particles chemically bound to it to form structured agglomerates of very large particle size; (c.) a number of highly structured, agglomerate particles composed primarily of smaller, highly altered clay platelets.

Figure 4:
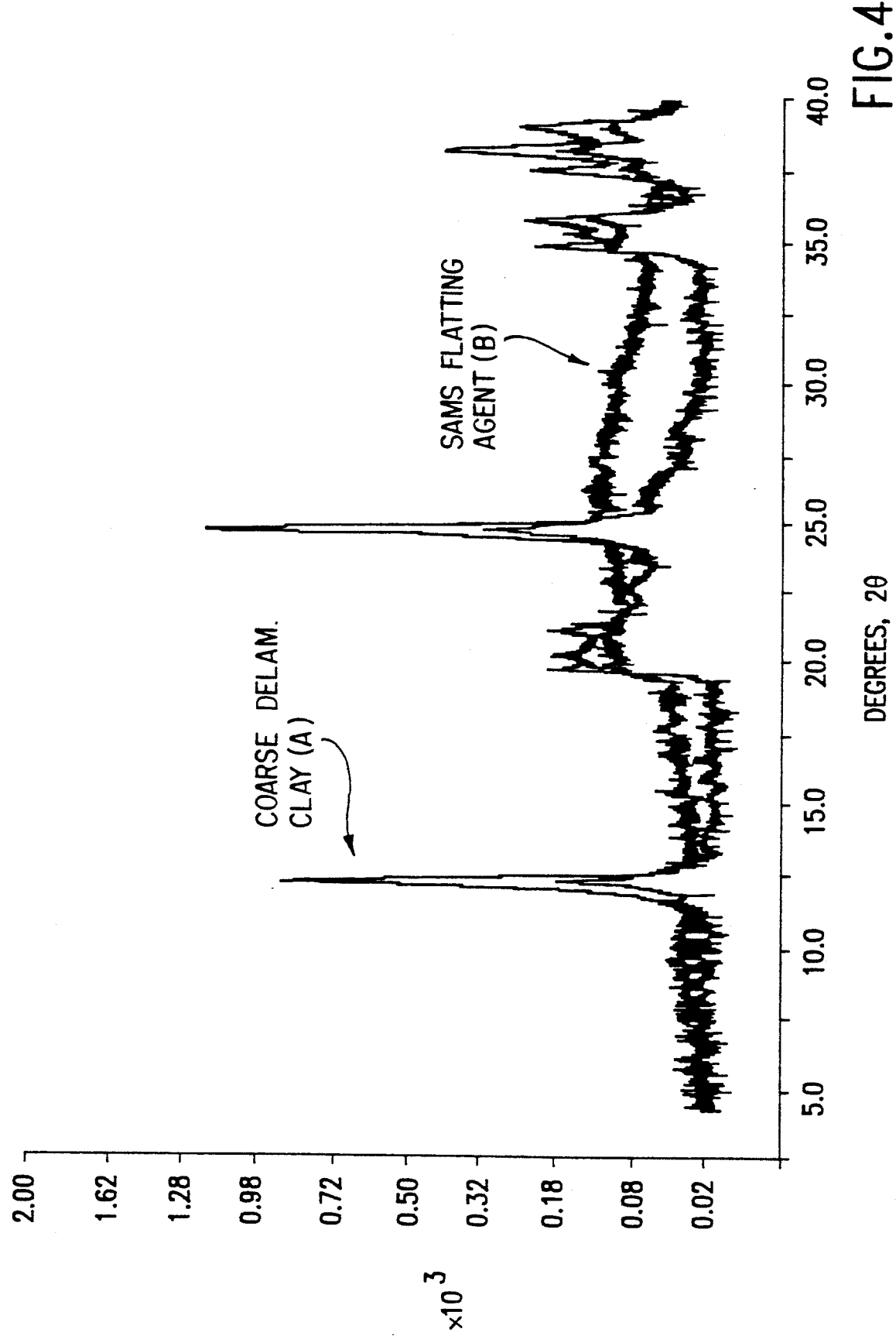
FIG. 4 compares the x-ray diffraction (XRD) patterns for a delaminated clay feedstock with the SAMS reaction product of the present invention.

Finally, the X-ray diffraction curves for delaminated clay feedstock and SAMS reaction product are compared in FIG. 4. XRD analysis of the SAMS product shows only an attenuated kaolinite pattern (with no accompanying presence of crystalline zeolites). This information indicates that the SAMS compositions of this invention are comprised of partially altered kaolin clay whose platelets have the integral rim area of amorphous non-diffracting sodium silicate-kaolin reaction product.

Based on the elemental analysis data from TABLE 3-A, the specific composition for our preferred SAMS product can be expressed in terms of its oxide constituents as $$0.87\ Na_2O:Al_2O_3:5.8\ SiO_2:3.4\ H_2O.$$

However, in more general terms, the range of SAMS compositions within the full scope of this invention is $$(0.6-1.6)\ Na_2O:Al_2O_3:(4.0-7.5)\ SiO_2:(1.0-5.0)\ H_2O.$$

A $Na_2O/Al_2O_3$ molar ratio composition range of 0.6–1.6 as well as a $SiO_2/Al_2O_3$ molar ratio range of 4.0–7.5 for the current SAMS products is clearly unique versus the compositions of the "preferred" prior art SAMS products of REFERENCES 1 or 2. Samhide 583 (per EXAMPLE TWO of REFERENCE 1) had an oxide composition of $$0.4\ Na_2O:Al_2O_3:3.3\ SiO_2:2.2\ H_2O$$

while Sampaque 5002 (per EXAMPLE 5 of REFERENCE 2) had an oxide composition of $$0.15\ Na_2O:Al_2O_3:2.34\ SiO_2:2.0\ H_2O.$$

Figure 5:
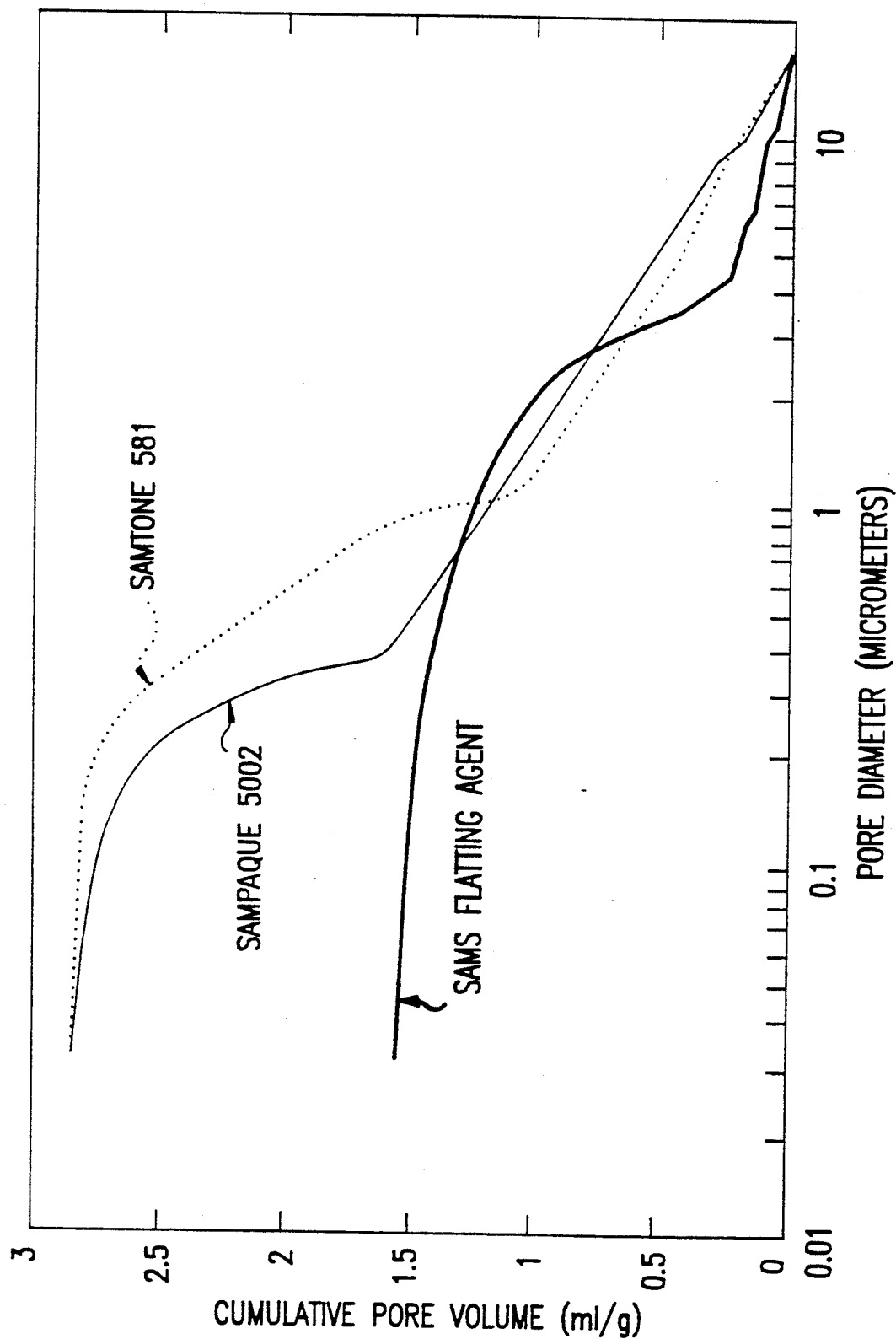
FIG. 5 presents the cumulative pore volume curves for the SAMS of Example 3, Samhide 583 and Sampaque 5002.
Figure 6:
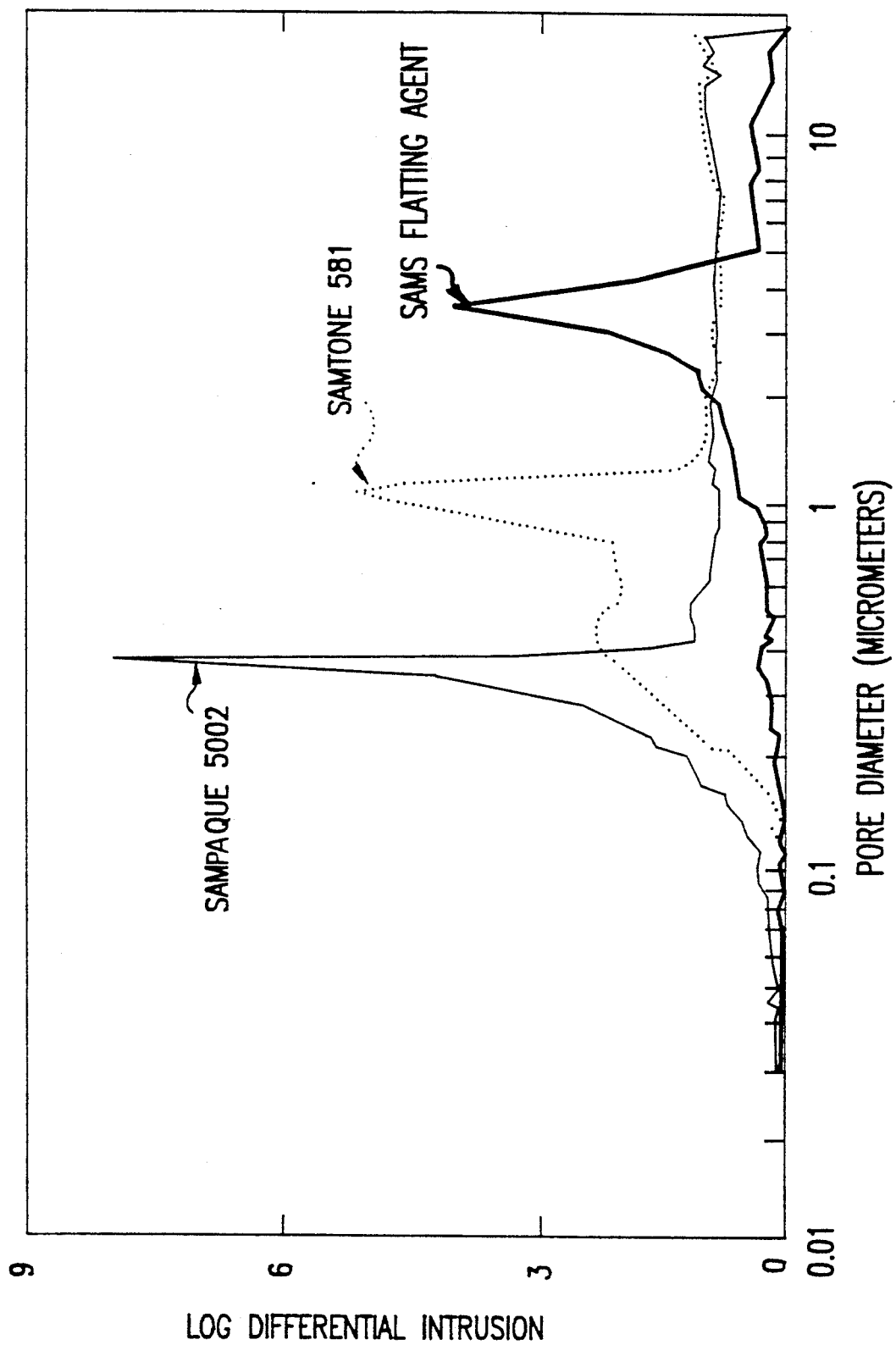
FIG. 6 is a plot of log differential intrusion versus pore diameter for a SAMS flatting agent, Sampaque 5002 and Samtone 581.

As can be seen in TABLE 3-B, the preferred SAMS product of this invention exhibits a novel combination of properties relative to the prior art SAMS products Samhide 583 and Sampaque 5002. Of particular significance is the extremely large difference in average particle size (by Malvern) in the current SAMS product (13.8 microns) Versus either Samhide 583 or Sampaque 5002 (6.5 and 6.3 microns respectively). The coarse particle size nature of the present SAMS product is a very critical property relative to its functionality as a paint flatting agent and/or as a film anti-block agent. Subsequent applications data on the present SAMS products are presented which indicate that their average particle size should preferably be in the range from 12.8 to 14.8 microns. In addition to particle size differences, the data of TABLE 3-B indicate substantially lower BET surface areas and pore volume values for the SAMS product of this invention. As discussed earlier in EXAMPLE 1, SAMS products within the scope of this invention will preferably exhibit BET surface areas of 5–7 m²/gm and total pore volumes of 1.4–1.6 ml/gm. The cumulative pore volume curves for the SAMS of EXAMPLE 3, Samhide 583 and Sampaque 5002, respectively, are presented in FIG. 5 for comparative purposes. Substantial differences in total intrusion volume and intrusion profile are evident. The differences in pore size distribution can be more clearly seen in FIG. 6, which is a plot of log differential intrusion versus pore diameter (where log differential intrusion equals dV/dlogD). The low total pore volume and correspondingly large pore diameter sizes associated with the preferred SAMS pigments of this invention are important properties relative to their functionality as flatting agents and as anti-block agents. Per the optical discussions previously presented within REFERENCE 2, pigment pore diameters falling outside the 0.2–0.7 micron size range are much less efficient in scattering visible light. The low pore volume and the large pore diameters of principally 2–4 microns in size associated with the present SAMS will obviously translate to greater optical transparency in certain end use applications (as per the application requirements of EXAMPLES 7, 8 and 9).

TABLE 3-B

Comparison of Typical Chemical/Physical Properties for Commercial SAMS Products

| | Chemical Analysis, % | | |
|---|---|---|---|
| | SAMHIDE 583**** | SAMPAQUE 5002***** | Coarse P.S. SAMS (Example 3) |
| $TiO_2$ | 0.51 | 0.50 | 0.34 |
| $Fe_2O_3$ | 0.83 | 0.80 | 0.21 |
| $SiO_2$ | 54.57 | 47.74 | 61.22 |
| $Al_2O_3$ | 27.95 | 34.66 | 17.87 |
| $Na_2O$ | 6.75 | 3.23 | 9.49 |
| $H_2O$ (% LOI)* | 10.71 | 12.23 | 10.87 |
| XRD | Attenuated Kaolin | Attenuated Kaolin | Attenuated Kaolin |
| Physical Properties: | | | |
| Pore Volume, ml/g (by Mercury Intrusion)** | 2.85 | 2.85 | 1.54 |
| BET Surface Area, m²/g | 21.5 | 22.0 | 6.0 |
| pH (at 20% solids) | 11.2 | 10.6 | 11.6 |
| Oil Absorption, g/100 g pigment | 150 | 105 | 100 |
| Brightness, % | 92.6 | 92.2 | 90.5 |
| Specific Gravity | 2.43 | 2.52 | 2.40 |
| Sedigraph Particle Size: | 61.0 | 84.0 | N.A. |
| % −2 microns | | | |
| Average "Stokes" Equivalent Particle Dia., microns | 1.7 | 0.7 | N.A. |
| Malvern*** Particle Size: | 6.5 | 6.3 | 13.8 |
| Average Equivalent Spherical Particle Diameter, microns | | | |
| Specific Surface Area, m²/g | 0.83 | 1.00 | 0.72 |

Note:
*LOI = Loss on Ignition (@ 925° C.)
**Total pore volumes were determined over an intrusion pressure range of 10.0–6029 psia. Data were collected using an advancing contact angle of 130 deg. and a pressure equilibration time of 10 sec. per intrusion measurement point. A Micromeritics AutoPore-II 9220 porosimeter was used for all measurements.
***A laser light-scattering particle size method using a Malvern Mastersizer E Analyzer.
****SAMS pigment of Example Two per U.S. Pat. No. 4,812,299 (Ref. #1).
*****Low Oil Absorption SAMS Pigment of Example 5 per USSN 567,563.
N.A. = Not Applicable.

In conclusion, this example serves to further illustrate some of the unique features associated with the preferred SAMS product of this invention. The preferred embodiments encompassing the entire sodium SAMS patent art is summarized for comparative purposes in TABLE 3-C. As can be clearly seen there, the SAMS of this invention require or exhibit a unique combination of process/product properties relative to the Samhide 583 and Sampaque 5002 pigment technologies.

TABLE 3-C

Comparative Summary of Sodium SAMS Product Art

| Important Process/<br>Product Parameters | "Preferred Embodiments" for Various Sodium-Based SAMS Products | | |
|---|---|---|---|
| | 1st Generation<br>SAMS (Ref. #1) | 2nd Generation<br>SAMS (Ref. #2) | SAMS of this<br>Invention |
| Process Parameters: | | | |
| Clay Feedstock(s): | Hydragloss-90 TM;<br>Omnifil TM; Hydraprint TM | No. 1 Kaolin Clays<br>(like Hydragloss 90) | Delaminated<br>Clay |
| Generic<br>Description(s) | E. Ga. fine p.s. clays;<br>Delam. clay | Fine p.s. clays | Middle Ga., coarse<br>p.s. delam. clay |
| "Sedigraph" Particle Size<br>(Average Stokes Dia.), micron | HG-90 = 0.2; Om = 0.3;<br>Hydpt.* = N.A. | 0.2–0.3 | N.A. |
| "Malvern" Particle Size (Average<br>Particle Diameter), microns | N.S. | N.S. | 6.0–6.5 |
| "Malvern" Specific<br>Surface Area, m$^2$/g | N.S. | N.S. | 0.80–0.87 |
| Sodium Silicate<br>Reagent(s) (SiO$_2$/Na$_2$O<br>Mole Ratio) | 2.5–3.3 | 2.06 | 3.3–4.0 |
| Base/Clay Mole Ratio | 0.25–0.9 | 0.3 | 1.0–1.4 |
| Reaction Solids, % | 5–15 | 10–14 | 20–23 |
| Reaction<br>Temp./Pressure | 140°–250° C./<br>50–360 psig | 172°–175° C./<br>120–130 psig | 172°–175° C./<br>120–130 psig |
| Cook Time, minutes | 15–240 | 60–65 | 60–75 |
| Reactor Mixing Intensity (Blade tip<br>speed), fpm | N.S. | 100 | 440 |
| Steam Addition Parameters: | | | |
| Initial Steam Flow (into reactor),<br>lbs./hr. | N.S. | 30,500 | 30,500 |
| Pressure-Up<br>Profile | N.S. | Non-linear Profile (55<br>psi intermediate<br>pressure point used) | inear<br>Profile |
| Total Ramp-Up<br>Time, Minutes | N.S. | 35–40 | 20–25 |
| Product Properties: | | | |
| SAMS Particle Size: | | | |
| "Sedigraph" Particle Size<br>(Average Stokes Dia.), microns | N.S. | 0.5–0.7 | N.A. |
| "Malvern" Particle Size (Average<br>Particle Dia.), microns | N.S. | N.S. | 12.8–14.8 |
| "Malvern" Specific<br>Surface Area, m$^2$/g | N.S. | N.S. | 0.68–0.78 |
| SAMS Product Structure: | | | |
| Oil Absorption,<br>g/100 g pigment | 80–160 | <115 | 90–110 |
| Pore Volume (by Hg<br>Intrusion), ml/g | N.S. | >2.5 | 1.4–1.6 |
| Pore Size Distribution<br>(Population Maxima), diameter<br>in microns | N.S. | 0.2–0.7 | 2.0–4.0 |
| BET Surface<br>Area, m$^2$/g | 10–30 | N.S. | 5.0–7.0 |
| SAMS Product Composition: | | | |
| (xNa$_2$O:Al$_2$O$_3$:ySiO:zH$_2$O mole ratios) | x = 0.01–2.0,<br>y = 2.0–20.0,<br>z = 1.0–5.0 | x = 0.01–0.5,<br>y = 2.01–3.0,<br>z = 1.0–3.0 | x = 0.6–1.6,<br>y = 4.0–7.5,<br>z = 1.0–5.0 |

Note:
N.A. = "Not Applicable" (this was typically designated for Sedigraph measurements on coarse particle size, delaminated clays due to their inherent departure from Stokes Law).
N.S. = "Not Specified" (parameters not specified in the prior art because of either a lack of understanding or from a lack of technical need at that time).
*Hydraprint TM (a commercially produced delaminated clay product of the J. M. Huber Corporation) was identified as a suitable delaminated feedstock for yielding particularly preferred SAMS products in the prior art of Ref. #1. A Malvern particle size measurement of Hydraprint indicates an Average Particle Diameter = 4.9 microns and a Specific Surface ARea = 1.22 m$^2$/g, which obviously differs greatly from the delminated feedstocks required to produce the SAMS of the present invention.

EXAMPLE 4

In this study, a series of SAMS pigments were produced from different delaminated clay feedstocks and subsequently evaluated as flatting agents in an exterior, latex paint formulation. In this work the experimental SAMS were also compared to the Samhide 583 paint pigment of the prior art (per EXAMPLE TWO of REFERENCE 1). The delaminated clays used as SAMS feedstocks varied across a wide range of average particle sizes and specific surface areas (running the gamut from 5.8 to 7.2 microns and from 0.68 to 1.03 m$^2$/gm, respectively). Each delaminated clay was hydrothermally reacted with N-sodium silicate reagent at a 1.2 B/C molar ratio and at 21% solids in the 7200 gallon, high pressure reactor described in EXAMPLE 3. All the reaction batches were brought to temperature and pressure in analogous fashion and maintained at 130 psig (175° C.) over a 75 minute cook period while continuously mixing at 440 fpm tip speed. For a 47,000 lb. reaction batch this then required 4,449 lbs. of active delaminated clay, 14,418 lbs. (as received) of N-sodium silicate reagent, 23,133 lbs. of batch water and 5,000 lbs.

of steam condensate to yield the desired stoichiometry. The resulting SAMS products were subsequently filtered, washed, redispersed and spray-dried as previously described in EXAMPLE 3. TABLE 4-A summarizes the particle size properties of the experimental SAMS products (B through H) as well as those of their respective delaminated clay feedstock. For comparative purposes, the particle size properties of Samhide 583 (product A) and its clay feedstock Hydragloss 90 are presented there as well.

reflected by high specific surface area values) is also detrimental to producing the SAMS products of this invention. A large amount of fine clay particles tends to produce more highly structured aggregate particles that are all of generally finer particle size (more in analogy with the high pore structure SAMS pigments Samhide 583 and Sampaque 5002 of the prior art). Although the effects of average clay particle size were discussed in REFERENCE 2, the influence of clay particle size distribution on final SAMS product properties was not recognized in the prior processes.

TABLE 4-A

Evaluation of Clay Feedstocks for Producing SAMS Flatting Pigments

| | | SAMS Reaction Products | | | Clay Feedstock Utilized | | |
|---|---|---|---|---|---|---|---|
| | | Malvern Particle Size Data | | | | Malvern Particle Size Data | |
| Product ID | Sodium Silicate & B/C Ratio*** | Average Equiv. Spherical Particle Dia., microns | Specific Surface Area, $m^2/g$ | Particle Size @ 10 Vol. %, microns | Clay Type | Average Equiv. Spherical Particle Dia., microns | Specific Surface Area, $m^2/g$ |
| A* | RU @ 0.5 | 6.5 | 0.83 | 2.2 | HG-90 (E. Ga. fine p.s.) | 0.52 | 5.13 |
| B | N @ 1.2 | 11.1 | 0.77 | 2.4 | Middle Ga. Delaminated | 5.8 | 1.03 |
| C | N @ 1.2 | 11.1 | 0.83 | 2.2 | Middle Ga. Delaminated | 6.7 | 0.71 |
| D | N @ 1.2 | 11.7 | 0.81 | 2.3 | Middle Ga. Delaminated | 7.2 | 0.68 |
| E | N @ 1.2 | 12.2 | 0.71 | 2.3 | Middle Ga. Delaminated | 6.3 | 0.92 |
| F** | N @ 1.2 | 13.8 | 0.72 | 2.5 | Middle Ga. Delaminated | 6.0 | 0.83 |
| G | N @ 1.2 | 14.4 | 0.69 | 3.3 | Middle Ga. Delaminated | 6.5 | 0.87 |
| H | N @ 1.2 | 14.4 | 0.72 | 3.2 | Middle Ga. Delaminated | 6.3 | 0.85 |

Note:
*A = SAMHIDE ™ 583: SAMS pigment of Example Two per U.S. Pat. No. 4,812,299 (Ref. #1).
**F = SAMS product from Example 3 of this invention.
***The other hydrothermal reaction parameters utilized to produce the SAMS pigments B-H were identical to those employed in Example 3, namely:
130 psig (175° C.) cook pressure/temp.;
75 minute cook time;
440 fpm reactor mixer tip speed;
21% reaction solids.

The data of TABLE 4-A indicate a wide variation in the SAMS product particle size as a function of the initial delaminated clay feedstock. Average particle size values for test SAMS B through H ranged from 11.1 up to 14.4 microns. In comparison, Samhide 583 (product A) exhibited an average particle size of 6.5 microns. It is very interesting to note that the two delaminated clay feedstocks of greatest average particle size in this study (test C and D), yielded SAMS pigments of generally fine particle size (11.1 and 11.7 microns respectively) versus its counterparts. These examples serve to illustrate that the particle size properties of the finished SAMS pigments can not be adequately explained solely on the basis of the delaminated clay's particle size. Instead one must also take into account the overall particle size distribution of a given delaminated clay (as reflected in its specific surface area value) to explain the SAMS pigment results. It is therefore evident that a given delaminated clay feedstock must possess specific particle size distribution characteristics in order for it to yield SAMS pigments of maximum particle size. A general absence of any fine particles in the delaminated clay (as reflected by extremely low specific surface area values) apparently hinders structured aggregate formation. The fine particles with all their available surface area are more highly altered and thereby act to aggregate larger platelet particles together. However, an overabundance of fine particles in the feedstock (as The SAMS pigments of TABLE 4-A were then evaluated in an exterior, latex house paint to determine their relative contributions to flatting. Except for varying the required flatting pigment, all of the remaining components of this paint formulation were kept constant. Additional details concerning the paint formulation as well as the final test results can be found in TABLE 4-B. The observed paint properties indicate that flatting efficiency, as measured in terms of 85° sheen, is correlatable to the average particle size of the SAMS pigment employed. One should note the far superior sheen control offered by the SAMS pigments of this invention versus the prior art Samhide 583 pigment. It will be demonstrated in subsequent application examples that SAMS pigment F, which has an average particle size of 13.8 microns, comes closest to matching the flatting performance of calcined diatomaceous silica products like Celite 281 and Celite 499. On that basis, SAMS products of this invention preferably have an average particle size falling within the range of 12.8 to 14.8 microns. This in turn means that delaminated clays having an average particle size of 6.0–6.5 microns and a specific surface area value of 0.76–0.90 $m^2/gm$ (or more preferably 0.80–0.87 $m^2/gm$) are the most useful clay feedstocks in producing the desired SAMS pigment for flatting applications.

TABLE 4-B

Flatting Pigment Evaluation in an Exterior Latex House Paint

| Ingredients: | Formulation in Pounds/100 Gallons |
|---|---|
| Water | 240.00 |
| Natrosol 250MBR | 4.00 |
| Ethylene Glycol | 27.90 |
| Polyphase AF-1 | 6.00 |
| Colloid 640 | 2.00 |
| Colloid 226 | 8.00 |
| AMP 95 | 1.00 |
| Igepal CO-630 | 2.00 |
| KTPP | 1.50 |
| Tipure R-900 | 250.00 |
| Zinc Oxide | 25.00 |
| Huber 35 (Coarse P.S. Clay) | 135.83 |
| Flatting Pigment | 44.37 |
| Mix at High Speed for 10 Minutes | |
| Water | 69.45 |
| Natrosol 250MBR | 1.25 |
| Ammonia | 0.50 |
| Colloid 643 | 2.00 |
| Texanol | 11.30 |
| Ucar 376, 55% | 357.93 |
| | 1,190.03 |

TEST RESULTS

Paint Properties:

| SAMHIDE ™ | 583* | Experimental SAMS (from Table 4-A) | | | | | | |
|---|---|---|---|---|---|---|---|---|
| SAMS Flatting Pigment: | A | B | C | D | E | F | G | H |
| Malvern Particle Size**, Microns | 6.5 | 11.1 | 11.1 | 11.7 | 12.2 | 13.8 | 14.4 | 14.4 |
| Solids, % | 56.19 | 55.93 | 56.01 | 56.21 | 56.19 | 56.09 | 56.00 | 56.27 |
| Consistency, Krebs Units | 90 | 88 | 88 | 87 | 90 | 87 | 87 | 91 |
| Fineness of Grind, Hegman | 4 | 5 | 5 | 5 | 3 | 4 | 5 | 3 |
| Directional Reflectance, Y Value, % | 91.6 | 91.7 | 91.6 | 91.6 | 91.3 | 91.7 | 91.6 | 91.3 |
| Contrast Ratio | 0.986 | 0.982 | 0.980 | 0.981 | 0.982 | 0.980 | 0.983 | 0.982 |
| Sheen, White Substrate, 85° | 4.4 | 2.8 | 2.8 | 2.8 | 2.5 | 2.2 | 2.1 | 2.0 |

Note:
*SAMS pigment of Example Two per U.S. Pat. No. 4,812,299 (Ref. #1).
**Malvern particle size (Average equivalent spherical particle diameter, in microns).

EXAMPLE 5

In this latex paint study, the flatting efficiency of tee coarse particle size SAMS product from EXAMPLE 3 was compared to a number of commercially available flatting agents. Two separate interior, flat latex paint formulations were examined. In the first paint series (see TABLE 5-A), the new SAMS pigment was evaluated head-to-head with the calcined diatomaceous silica products Celite 281 and Celite 499 on an equal weight replacement basis. The flatting agents were used at an addition level of 50 pounds per 100 gallons. The test results are summarized at the bottom of TABLE 5-A. The observed sheen and gloss properties indicate that our SAMS pigment performs very similarly to the Celite 281 flatting agent. However, the Hegman grind and tinting strength properties of the SAMS pigment falls directly between those of the two Celite pigments. These paint data clearly indicate that the SAMS pigment of EXAMPLE 3 can in most instances be used as a direct drop in replacement for the Celite 281 flatting pigment.

TABLE 5-A

Evaluation of Flatting Pigment In an Interior, Flat Latex Paint

| Ingredients: | Formulation in Pounds/100 gals. |
|---|---|
| Water | 250.20 |
| Ethylene Glycol | 27.75 |
| Cellosize QP 15,000 | 6.00 |
| Colloid 226 | 5.25 |
| AMP 95 | 1.96 |
| Colloid 643 | 1.75 |
| Nuosept 95 | 2.05 |
| Tipure R-901 | 150.00 |
| Huber 70C (Calcined Clay) | 152.50 |
| Flatting Pigment | 50.00 |
| Mix at High Speed for 10 Minutes | |
| Water | 252.12 |
| Cellosize QP-15,000 | 2.00 |
| AMP 95 | 0.98 |
| Texanol | 5.92 |
| Ucar 367, 55% | 175.31 |
| Total = | 1,083.79 |

Test Results

Paint Properties:

| Flatting Pigment Used: | Celite 281 | SAMS (Example 3) | Celite 499 |
|---|---|---|---|
| Solids, % | 42.46 | 42.57 | 42.56 |
| Consistency, Krebs Units | 81 | 82 | 80 |
| Fineness of Grind, Hegman | 2 | 3 | 4 |
| Directional Reflectance, Y | 92.6 | 93.0 | 92.6 |

TABLE 5-A-continued

| Value, % | | | |
|---|---|---|---|
| Contrast Ratio | 0.985 | 0.985 | 0.990 |
| Tinted Reflectance, Y Value, % | 50.9 | 51.3 | 51.4 |
| Relative Tint Strength, % | — | 2.4 | 3.1 |
| Sheen, White Substrate, 85° | 2.2 | 1.9 | 2.2 |
| Gloss, White Substrate, 60° | 2.5 | 2.5 | 3.5 |

In the second latex paint series (see TABLE 5-B), the SAMS pigment of EXAMPLE 3 was evaluated against the Diafil product line. The Diafil products 520, 530, 570 and 590 are a family of non-calcined diatomaceous silica pigments. They are being commercially offered to the paint industry as low crystalline silica alternatives to the Celite pigment line. Their low crystalline silica content (approximately 1% by weight) is directly attributable to their hydrous, non-calcined form. Nonetheless, the absence of high temperature calcination leaves these diatomaceous silicas with some product deficiencies versus a Celite 281, such as lower pigment brightness and significantly reduced flatting efficiency. However, for the paint formulator resigned to adopt the OHSA guidelines on a crystalline silica content in his paint of less than 0.1%, there was previously little choice but to use such inferior flatting agents or to use expensive synthetic amorphous silicas at about 4 to 5 times the cost. The SAMS flatting pigments of the present invention solved this dilemma for the paint formulator in that they simultaneously offer excellent flatting efficiency and a low crystalline silica content, but also at a very reasonable cost when compared to the original Celite pigments.

TABLE 5-B

Evaluation of SAMS Vs. Diafil Flatting Pigments In an Interior, Flat Latex Paint

| Ingredients: | Formulation in Pounds/100 Gallons |
|---|---|
| Water | 250.20 |
| Ethylene Glycol | 27.75 |
| Cellosize QP-15,000 | 6.00 |
| Colloid 226 | 5.25 |
| AMP 95 | 1.96 |
| Colloid 643 | 1.75 |
| Nuosept 95 | 2.05 |
| Tipure R-901 | 150.00 |
| Huber 70C (Calcined Clay) | 171.80 |
| Flatting Pigment | 35.00 |
| Mix at High Speed for 10 Minutes | |
| Water | 251.97 |
| Cellosize QP-15,000 | 2.00 |
| AMP 95 | 0.98 |
| Texanol | 5.92 |
| Unocal 3011 | 175.31 |
| Total = | 1,087.94 |

Interior Latex Flat Paint Test Results

| Paint Properties: | | | | | |
|---|---|---|---|---|---|
| Flatting Pigment Used: | SAMS (Example 3) | Diafil 520 | Diafil 530 | Diafil 570 | Diafil 590 |
| Solids, % | 42.34 | 42.21 | 42.19 | 42.19 | 42.15 |
| Consistency, Krebs Units | 85 | 98 | 94 | 91 | 95 |
| Fineness of Grind, Hegman | 2.75 | 0 | 2.25 | 2.25 | 1.5 |
| Directional Reflectance, Y Value, % | 93.4 | 93.0 | 93.0 | 93.2 | 93.2 |
| Contrast Ratio | 0.988 | 0.991 | 0.990 | 0.990 | 0.992 |
| Tinted Reflectance, cc, Y Value, % | 53.3 | 54.0 | 54.1 | 54.2 | 54.8 |
| Relative Tint Strength, % | 0 | 4.4 | 5.1 | 5.7 | 9.8 |
| Sheen, White Substrate, 85° | 3.2 | 4.0 | 4.9 | 4.7 | 6.9 |
| Gloss, White Substrate, 60° | 2.6 | 2.6 | 2.6 | 2.6 | 2.7 |
| Scrub Resistance, Abrasive Medium Cycles | 73 | 58 | 63 | 62 | 56 |
| Porosity, K&N Ink, Y Values Reflectance Retained, % | 70.4 | 69.9 | 69.3 | 70.0 | 70.3 |

The interior latex paint series of TABLE 5-B demonstrates the superior flatting properties of the new SAMS pigment versus all the Diafil pigments. Paint performance advantages in Hegman grind, color, sheen control and scrub resistance were observed for the SAMS pigment of this invention. The higher sheen values and greater tinting strengths obtained with the Diafil pigments are a net result of their finer particle size nature, while their very low pigment brightness obviously has a negative impact on the resulting coating color. The pigment brightness and particle size properties of the SAMS, Celite and Diafil flatting agents are summarized in TABLE 5-C for comparative purposes.

TABLE 5-C

Select Physical Properties for Flatting Pigments

| | Brightness, % | "Malvern" Particle Size (Av. Particle Dia.), microns |
|---|---|---|
| SAMS Flatting Agent (from Example 3) | 90.5 | 13.8 |
| Celite 281 | 88.0 | 10.9 |
| Celite 499 | 89.5 | 9.9 |
| Diafil 520 | 74.0 | 11.2 |
| Diafil 530 | 73.0 | 10.4 |
| Diafil 570 | 78.0 | 10.8 |
| Diafil 590 | 76.5 | 7.9 |

Figure 3:
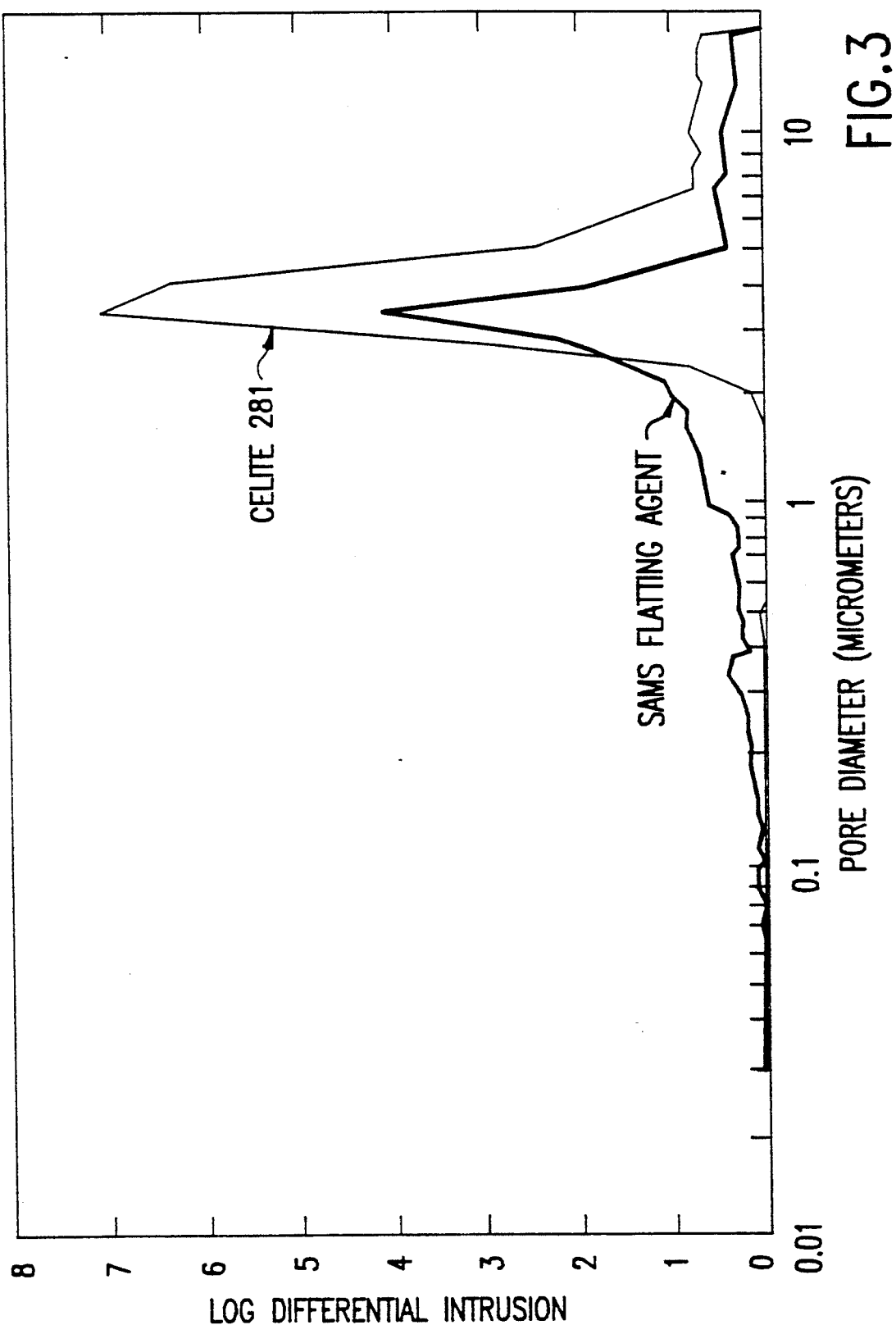
FIG. 3 plots the log differential intrusion as a function of diameter for a SAMS flatting agent and celite 281.
Figure 7:
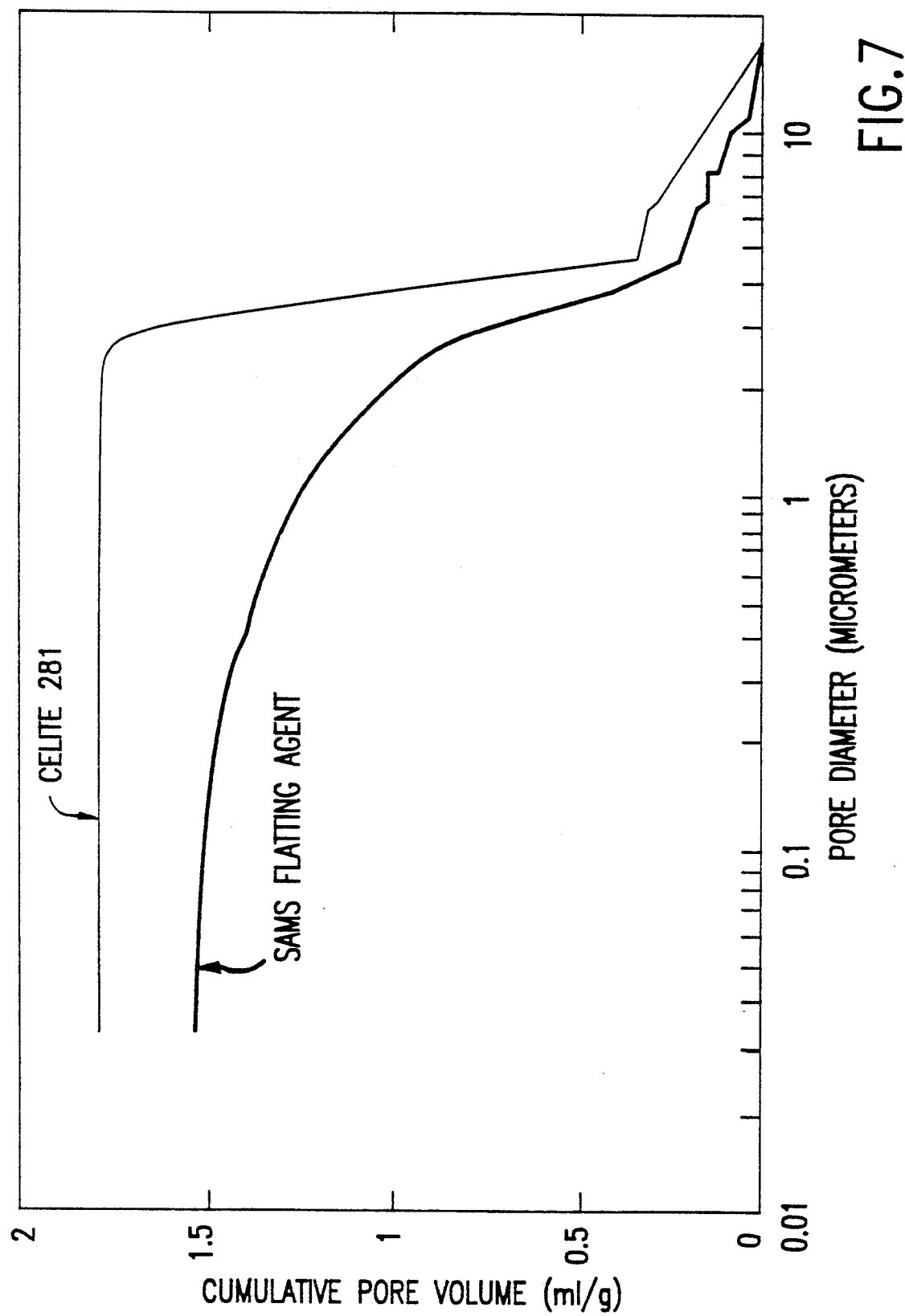
FIG. 7 plots the cumulative pore volume versus diameter for a SAMS flatting agent and Celite 281.

In addition to TABLE 5-C, the pore structure properties of Celite 281 and the new SAMS flatting agent are directly compared in FIGS. 7 and 3. The cumulative pore volume and pore size distribution curves indicate somewhat similar structural properties for these two pigments. Both pigments have relatively low pore volumes whose unimodal pore size distributions are centered near a pore diameter size of 3.0 microns. However, it is clear from FIG. 3 that the Celite 281 distribution is skewed somewhat more towards pore diameters greater than 3.0 microns, while the opposite can be said of the SAMS pore size distribution. The very large pore diameters associated with these pigments are responsible for their optical transparency in certain applications (see EXAMPLES 7, 8 and 9). As discussed elsewhere (REFERENCE 2), only pigment pore structure having nominal pore diameters falling within the 0.2–0.7 micron size range is optically efficient in scattering visible light. Given the apparent morphology differences in the SAMS and calcined diatomaceous silica pigments, it is rather surprising that their pore structure properties are as similar as they are. However, these pore structure similarities in combination with the coarse particle size nature of each, goes a long way towards explaining their similarities in flatting performance despite the pigment morphology differences. In summary, it is truly remarkable that a delaminated kaolin clay of platelet-like morphology could be chemically transformed into a structured SAMS pigment by the hydrothermal process of this invention to yield a flatting agent functionally similar to Celite 281 (a calcined diatomaceous silica pigment).

EXAMPLE 6

In this application study, the pigment performance of Celite 281 and the SAMS pigment of EXAMPLE 3 are compared in a typical exterior, flat alkyd house paint formulation. The flatting pigments were used in this formulation at an addition level of 100 pounds per 100 gallons. Additional details concerning the paint formulation as well as the final test results can be found in TABLE 6.

The observed paint properties indicate similar flatting performance between Celite 281 and the SAMS of EXAMPLE 3. However, the SAMS pigment did show some performance advantages in two key areas: Hegman grind and color retention after UV light exposure. A net improvement in color retention for the SAMS based formulation is indicated by the lower "Delta L" change of 2.5 (as compared to a 3.1 Delta with the Celite 281). The QUV testing was conducted by exposing paint drawdowns made on aluminum panels to a UV-B lamp (313 nm) source for 1,000 hours per ASTM procedure D4587. This SAMS performance property is particularly advantageous in all exterior paint applications where long-term UV light exposure is anticipated.

TABLE 6

Evaluation of Flatting Pigments
In an Exterior Flat Alkyd House Paint
Formulation in Pounds/100 Gallons

|  | A | B |
| --- | --- | --- |
| Rule 66 Mineral Spirits | 64.00 | 64.00 |
| Aroplaz 1266 M-70 | 317.07 | 317.07 |
| Bentone SD-1 | 5.00 | 5.00 |
| Huber 35 | 254.82 | 254.82 |
| Unitane OR 600 | 250.00 | 250.00 |
| Colortrend #888-9907B (Lamp Black) | 11.52 | 11.52 |
| Celite 281 | 100.00 | — |
| SAMS (Example 3) | — | 100.00 |
| Grind Above at High Speed for 10 Minutes | | |
| Rule 66 Mineral Spirits | 153.61 | 153.61 |
| Cobalt, 12% | 0.92 | 0.92 |
| Calcium, 10% | 5.55 | 5.55 |
| Exkin #2 | 1.50 | 1.50 |
| Total = | 1,163.99 | 1,163.99 |
| Test Results | | |
|  | Paint Identification: | |
| Paint Properties: | A | B |

TABLE 6-continued

Evaluation of Flatting Pigments
In an Exterior Flat Alkyd House Paint
Formulation in Pounds/100 Gallons

|  | A | B |
| --- | --- | --- |
| Flatting Pigment Used: | Celite 281 | SAMS (Example 3) |
| Solids, % | 72.49 | 72.08 |
| Consistency, Krebs Units | 75 | 75 |
| Fineness of Grind, Hegman | 0 | 3 |
| Tinted Reflectance, Y Value, % | 46.7 | 46.7 |
| Contrast Ratio | 1.000 | 1.000 |
| Sheen, White Substrate, 85° | 1.3 | 1.5 |
| Gloss, White Substrate, 60° | 3.0 | 3.1 |
| Gloss, White Substrate, 20° | 1.0 | 1.0 |
| QUV* Data: | | |
| Before | | |
| L | 68.2 | 68.0 |
| a | −1.7 | −1.7 |
| b | −3.2 | −3.3 |
| 60° Gloss | 1.8 | 1.8 |
| After | | |
| L | 71.3 | 70.5 |
| a | −1.7 | −1.8 |
| b | −2.8 | −3.1 |
| 60° Gloss | 1.6 | 1.6 |
| Color Change Delta L | 3.1 | 2.5 |
| Gloss Change | 0.2 | 0.2 |

Note:
*UV exposure for 1000 hrs. per testing procedure ASTM D4587.

EXAMPLE 7

In this test program a series of flatting pigments, including the SAMS pigment of EXAMPLE 3, were compared in a flat black enamel formulation. The type of enamel formulation tested here is very commonly used on barbecue grills and other manufactured metal goods. The flatting pigments were respectively used at an addition level of 75 pounds per 100 gallons paint. Additional paint formulation details as well as the final test results can be found in TABLE 7 below.

The observed paint properties indicate that the SAMS flatting pigment is very well suited to this enamel application. The SAMS pigment provided the greatest sheen and gloss control as well as the lowest directional reflectance value. Although all the paint contrast ratios were 100%, a low directional reflectance is very desirable as it indicates less milkiness or tinting effect of the extender pigments. These pigment properties serve to make the SAMS formulation provide a better jetness of color (i.e., the blackest appearance). Again, it is quite remarkable that our SAMS product (a delaminated clay based pigment) could provide flatting properties that exceed the performance of established high value flatting agents.

TABLE 7

Evaluation of Flatting Pigments in a Flat Black Enamel

| Ingredients: | Formulation in Pounds/100 Gallons |
| --- | --- |
| Hubercarb Q6 | 475.00 |
| Bentone SD-1 | 7.75 |
| Alcolec S | 3.00 |
| Aroflat 3113-P-30 | 294.00 |
| Daniel's Black Paste BB 1331 | 112.00 |
| Flatting Pigment | 75.00 |
| Grind above at high speed for 10 minutes | |
| Mineral Spirits | 142.00 |
| Cobalt, 12% | 0.63 |
| Calcium, 10% | 0.60 |

TABLE 7-continued

Evaluation of Flatting Pigments in a Flat Black Enamel

| | | | | | |
|---|---|---|---|---|---|
| Exkin #2 | | 1.25 | | | |
| | Total = | 1,111.23 | | | |

Test Results

Paint Properties:

| Flatting Pigment Used: | Dicalite L-5 | Celite 281 | Celite 499 | SAMS (Example 3) | Zeolex 35P |
|---|---|---|---|---|---|
| Solids, % | 64.23 | 64.21 | 64.07 | 63.79 | 63.92 |
| Consistency, Krebs Units | 75 | 76 | 76 | 85 | 84 |
| Fineness of Grind, Hegman | 2 | 1 | 4 | 2 | 4 |
| Directional Reflectance, Y Value, % | 3.5 | 3.5 | 3.6 | 3.4 | 3.7 |
| Contrast Ratio | 100 | 100 | 100 | 100 | 100 |
| Sheen, White Substrate, 85° | 1.0 | 0.8 | 1.1 | 0.8 | 2.0 |
| Gloss, White Substrate, 60° | 1.0 | 1.0 | 1.0 | 0.9 | 1.0 |
| Jetness of Color (Visual) | Good | Good | Fair | Excellent | Fair |

EXAMPLE 8

In this application study, the SAMS pigment of EXAMPLE 3 was tested against several of the more popular commercial flatting agents in a polyurethane satin varnish formulation. The use of flatting agents in polyurethane varnishes is becoming increasingly prevalent so as to yield a satin finish product. Equal amounts of flatting agent, 49.43 pounds per 100 gallons, were employed in this varnish test series. Additional formulation details as well as the final test results can be found in TABLE 8 below.

The sheen and gloss data of TABLE 8 indicate that the SAMS pigment of this invention yields slightly better flatting efficiency than the competitive calcined diatomaceous silica product Celite 281. Furthermore, the SAMS pigment enjoys a notable advantage in Hegman grind over Celite 281. In comparison to the synthetic amorphous silica or metal silicate pigments of TABLE 8, the SAMS flatting agent yields comparable to generally superior sheen and gloss control on a equal weight replacement basis. It is quite remarkable that an inexpensive delaminated clay has been converted into a highly functional, value added pigment by the teachings of the present invention.

TABLE 8

Flatting Pigment Evaluation in a Polyurethane Satin Varnish

| Ingredients: | Formulation in Pounds/100 Gallons |
|---|---|
| Cellomer 3065 | 117.70 |
| Bentone SD-1 | 2.15 |
| Rule 66 Mineral Spirits | 123.92 |
| Xylene | 38.95 |
| Flatting Pigment | 49.43 |
| Grind above at high speed for 10 minutes | |
| Aroplaz 1266 M70 | 96.06 |
| Rule 66 Mineral Spirits | 51.30 |
| Cobalt, 12% | 1.20 |
| Calcium, 10% | 8.66 |
| Exkin #2 | 1.34 |
| Urotuf 13-307 | 269.79 |
| Total = | 760.50 |

Test Results

Paint Properties:

| Flatting Pigment Used: | Syloid 235 | Zeolex 35P | Zeothix 95 | SAMS (Example 3) | Celite 281 |
|---|---|---|---|---|---|
| Solids, % | 44.69 | 45.18 | 44.68 | 44.97 | 45.29 |
| Fineness of Grind, Hegman | 5 | 5 | 5 | 3 | 1.5 |
| Directional Reflectance, Y Value, Black Substrate % | 1.2 | 1.1 | 1.1 | 2.1 | 1.4 |
| Sheen, White Substrate, 85° | 31.8 | 78.9 | 53.7 | 26.2 | 29.4 |
| Gloss, White Substrate, 60° | 18.1 | 64.4 | 28.4 | 23.1 | 27.5 |
| Zahn #2 Cup-seconds | 22.09 | 20.99 | 26.44 | 21.55 | 22.85 |

EXAMPLE 9

Low density polyethylene (LDPE) and polypropylene (PP) film have a natural tendency to stick together, which is commonly referred to as "blocking". SAMS pigments of the present invention were evaluated to determine their anti-blocking capabilities in 2-mil LDPE film.

Test batches of LDPE resin and various SAMS pigments were blended at 10% filler loadings and subsequently compounded on a ZSK 30 millimeter twin screw extruder. The LDPE resin employed in this study was Gulf 5200. Pressouts from each concentrate were then made to verify the quality of sample dispersion. SAMS pigments from EXAMPLE 2 of this invention were compared to the SAMS anti-block agent (Samflex 585) of the prior art (REFERENCE NO. 1). TABLE 9-A summarizes the pigment particle size properties, final filler loadings and resulting LDPE film testing results. As indicated in TABLE 9-A, the compositions containing the new SAMS pigments were ultimately let-down to a 0.3% loading before producing film samples. Film of 2-mil thickness was produced on a 1 inch Killion extruder. All film samples were produced on the same day under identical machine operating conditions. The blocking force and the percent haze were then determined on the film samples.

The test data in TABLE 9-A clearly show that the SAMS pigments of the present invention provide far better anti-blocking properties in LDPE film than the Samflex 585 pigment of the prior art. Equivalent to superior blocking force was observed with the new SAMS pigments utilized at only a 0.3% loading versus the Samflex 585 at a filler loading of 10%. The advantages of having effective anti-blocking properties at such low SAMS filler loadings is reflected in improved film clarity. The optical data indicate haze was reduced from 9.0% to 7.4%. It should also be noted that the magnitude of blocking force appears closely related to the SAMS pigment particle size.

is a high-value, calcined diatomaceous silica product marketed by the Johns-Manville Corporation. Superfloss, like its flatting agent counterparts, now suffers from a regulatory standpoint by having a very high crystalline silica content that can potentially present a respiratory safety hazard during its use at plastics compounding operations. As the test data of TABLE 9-B show, a SAMS pigment per the present teachings offers the plastics compounder a low crystalline silica alternative that provides superior film anti-block properties. A blocking force of 9 grams was observed for the SAMS filled film system while Superfloss provided only 52 grams at an equivalent filler loading of 0.3%. Furthermore, the SAMS system also shows a notable performance advantage in film strength as measured by the puncture force using free falling darts. The compounding and film forming steps employed in this work were identical to that described in part 1 above. Finally, it should be noted that the low crystalline silica content of SAMS versus calcined diatomaceous silicas should thereby offer some additional process benefits from reduced abrasion. Lower abrasion characteristics for the SAMS anti-block agent was clearly demonstrated by Einlehner abrasion testing (see Footnote of TABLE 9-B). An Einlehner value of 21 represents significant reduction in abrasion versus the 116 value determined for Superfloss. The Einlehner abrasion method does not represent actual end-use abrasion values obtained from within a piece of plastics compounding or film equipment, but it does provide one a relative assessment of inherent pigment abrasiveness. One would therefore expect a SAMS pigment of the present invention to

TABLE 9-A

Antiblock Compositions Using LDPE Resin (Gulf-5200): (2-mil Film Thickness)

| SAMS Antiblock Agent | Filler Particle Size (Malvern Av. Particle Dia.), microns | Filler Loading, % | Test Results Blocking Force, gm | Haze, % Opacity |
|---|---|---|---|---|
| SAMFLEX 585 (SAMS per Example Two of Ref. #1) | 6.5 | 10 | 67 | 9.0 |
| Coarse P.S. SAMS* (from Example 2, Test Pigment C) | 12.8 | 0.3 | 65 | 7.6 |
| Coarse P.S. SAMS* (from Example 2, Test Pigment E) | 14.5 | 0.3 | 9.0 | 7.4 |
| None | — | 0 | 113 | 11.0 |

Note:
*SAMS pigments per the teachings of this invention.

In part 2 of this LDPE film study, the SAMS pigment of 14.5 micron particle size was re-evaluated against the well known film anti-block agent Superfloss. Superfloss cause far less equipment problems related ultimately to wear.

TABLE 9-B

Antiblock Evaluations in LDPE Film (Gulf-5200 Resin): (2-mil Film Thickness)

| Antiblock Agent* | Filler Loading, % | Test Results Blocking Force, gm | Free-Falling Darts, in.-lbs. | COF** | Haze, % Opacity |
|---|---|---|---|---|---|
| Coarse P.S. SAMS (from Example 2, Test Pigment E) | 0.3 | 9 | 170 | 0.82 | 7.4 |
| Superfloss | 0.3 | 52 | 127 | 0.75 | 7.6 |

Note:
*Abrasion testing of the above Antiblock Agents yielded the following data:

|  | Einlehner Abrasion, mg wire loss |
|---|---|
| Coarse P.S. SAMS | 21 |
| Superfloss | 116 |

TABLE 9-B-continued

Antiblock Evaluations in LDPE Film (Gulf-5200 Resin):
(2-mil Film Thickness)

**COF = Coefficient of Friction.

While the present invention has been described with reference to specific embodiment, it is not limited thereto, but is intended to cover the invention broadly within the spirit of scope of the appended claims.

What is claimed is:

1. A synthetic sodium aluminosilicate produced by the hydrothermal reaction of a delaminated kaolin clay with a sodium silicate having crystalline silica content of less than 0.1% by weight, a oil absorption of from 90–110 gm/100 gm; an average particle diameter of from 12.8–14.8 microns; as specific surface area of from 0.68–0.78 m$^2$/gm; BET surface area of from 3–9 m$^2$/gm; total pore volume by mercury intrusion of 1.2–1.8 ml/gm; pore structure with pore diameter from 2–4 microns as determined by log differential intrusion analysis and having a general oxide formula of $$(0.6-1.6)Na_2O:Al_2O_3:(4.0-7.5)SiO_2:(1.0-5.0)H_2O.$$

2. The product of claim 1 wherein the BET surface area is 5–7 m$^2$/gm.

3. The product of claim 1 wherein the total pore volume by mercury intrusion is 1.4–1.6 ml/gm.

4. The method of producing a synthetic aluminosilicate by the reaction of a delaminated kaolin clay with a sodium silicate at 15–25% solids wherein the kaolin feedstock is a coarse particle size delaminated clay with an average particle diameter by Frannhofer diffraction of 6.0–6.5 microns with a specific surface area of 0.76–0.90 m$^2$/gm; the sodium silicate has a SiO$_2$/Na$_2$O molar ratio of 2.6–4.0 and the Base/Clay molar ratio is from 0.8–1.6, reaction pressures of from 50–360 psig and temperatures of 140°–250° C.; with reaction times of 60–75 minutes; and mechanical mixing with 370–500 fpm tip speed.

5. The method of claim 4 wherein the kaolin feedstock is a primarily cretaceous, middle Georgia crude.

6. The method of claim 4 wherein the specific surface area is from 0.80–0.87 m$^2$/gm.

7. The method of claim 4 wherein the SiO$_2$/Na$_2$O molar ratio of the sodium silicate is 3.3–4.0.

8. The method of claim 4 wherein the Base/Clay (B/C) molar ratio if from 1.0–1.4.

9. The method of claim 4 wherein the reaction solids are from 20–23% by weight in a reactor utilizing live steam.

10. The method of claim 4 wherein the reaction pressure is 120–130 psig.

11. The method of claim 4 wherein the reaction temperature is from 172°–175° C.

12. The method of claim 4 where at pressures of 120–130 psig reaction times of 60–75 minutes are employed.

13. The method of claim 4 wherein a rapid pressure-up profile is employed requiring 20–25 minutes to reach 120–130 psig.

14. A flatting agent for paint as produced in accordance with claim 4.

15. An anti-block agent for plastic film produced in accordance with claim 4.

16. A flatting agent for paint as defined by claim 1.

17. An anti-block agent for plastic film as defined by claim 1.

* * * * *